(12) United States Patent
Hamamura et al.

(10) Patent No.: US 12,233,439 B2
(45) Date of Patent: Feb. 25, 2025

(54) DEVICE, SYSTEM, AND METHOD FOR PERFORMING MAINTENANCE ON OBJECT

(71) Applicant: LEBO ROBOTICS, INC.

(72) Inventors: Keitaro Hamamura, Tokyo (JP); Sumio Ito, Tokyo (JP); Daichi Kanawa, Tokyo (JP); Toshinobu Takei, Aomori (JP); Shunsuke Hayashi, Aomori (JP)

(73) Assignee: LEBO ROBOTICS, INC., Tokyo (JP)

( * ) Notice: Subject to any disclaimer, the term of this patent is extended or adjusted under 35 U.S.C. 154(b) by 0 days.

(21) Appl. No.: 17/067,507

(22) Filed: Oct. 9, 2020

(65) Prior Publication Data

US 2021/0107036 A1 Apr. 15, 2021

Related U.S. Application Data

(63) Continuation of application No. 16/488,557, filed as application No. PCT/JP2018/007197 on Feb. 27, 2018, now abandoned.

(30) Foreign Application Priority Data

Feb. 27, 2017 (JP) .................................. 2017-035323
Jul. 21, 2017 (JP) .................................. 2017-142289

(51) Int. Cl.
   *B08B 1/10* (2024.01)
   *B08B 3/04* (2006.01)
   (Continued)

(52) U.S. Cl.
   CPC .................. *B08B 1/10* (2024.01); *B08B 3/04* (2013.01); *B25J 5/02* (2013.01); *B25J 11/0065* (2013.01); *F03D 80/50* (2016.05)

(58) Field of Classification Search
   CPC ......... F03D 80/50; F03D 80/55; B08B 1/001; B08B 3/024
   See application file for complete search history.

(56) References Cited

U.S. PATENT DOCUMENTS 7,740,107 B2 * 6/2010 Lemburg ................ F03D 80/50
                                                    182/142
8,062,431 B2 * 11/2011 Kumar ..................... B08B 3/022
                                                    134/10
(Continued)

FOREIGN PATENT DOCUMENTS

CN      101983287 A    3/2011
DE      19726408       3/1999
(Continued)

OTHER PUBLICATIONS

KR-101368675-B1 Machine Translation (Year: 2014).*
(Continued)

*Primary Examiner* — Michael W Hotchkiss
(74) *Attorney, Agent, or Firm* — Haley Guiliano LLP; James F. Haley, Jr.

(57) ABSTRACT

A device for performing maintenance on an object is provided. The device for performing maintenance on an object comprises an attaching means that enables the device to attach to a part of an object, the attaching means being configured to deform in accordance with a shape of a part of the object, a moving means that enables the device to move on the object, and a maintenance means that performs maintenance on the object. In one embodiment of the present invention, the attaching means is configured so that the device maintains a state of attaching to the part of the object by the deformation of the attaching means even when a shape of a part of the object changes in association with the movement.

15 Claims, 29 Drawing Sheets

(51) Int. Cl.
*B25J 5/02* (2006.01)
*B25J 11/00* (2006.01)
*F03D 80/50* (2016.01)

(56) References Cited

U.S. PATENT DOCUMENTS

| | | | | |
|---|---|---|---|---|
| 8,083,029 | B2* | 12/2011 | Teichert | F03D 80/50 |
| | | | | 182/128 |
| 8,544,484 | B2 | 10/2013 | Jensen | |
| 8,578,604 | B2* | 11/2013 | Malaschewski | F03D 80/50 |
| | | | | 29/889.1 |
| 8,863,903 | B2* | 10/2014 | Besselink | B66F 11/04 |
| | | | | 182/142 |
| 9,574,549 | B2 | 2/2017 | Lee | |
| 10,161,389 | B2* | 12/2018 | Teichert | F03D 80/50 |
| 10,260,483 | B2* | 4/2019 | Teichert | F03D 80/50 |
| 10,814,438 | B2* | 10/2020 | Senthoorpandian | F03D 13/10 |
| 2005/0042102 | A1* | 2/2005 | Teichert | B08B 1/04 |
| | | | | 416/146 R |
| 2006/0175465 | A1* | 8/2006 | Teichert | B66F 11/04 |
| | | | | 244/33 |
| 2009/0020361 | A1* | 1/2009 | Teichert | E04G 3/30 |
| | | | | 182/36 |
| 2009/0169734 | A1 | 7/2009 | Teichert | |
| 2009/0173573 | A1* | 7/2009 | Teichert | E04G 3/30 |
| | | | | 182/19 |
| 2010/0018551 | A1* | 1/2010 | Gallegos | F03D 80/50 |
| | | | | 15/21.1 |
| 2010/0132137 | A1* | 6/2010 | Eggleston | B08B 3/022 |
| | | | | 15/21.1 |
| 2010/0139062 | A1* | 6/2010 | Reed | F03D 13/10 |
| | | | | 29/23.51 |
| 2011/0088723 | A1* | 4/2011 | Jensen | B05B 13/0436 |
| | | | | 134/18 |
| 2011/0303488 | A1* | 12/2011 | Besselink | F03D 80/50 |
| | | | | 182/142 |
| 2011/0318496 | A1* | 12/2011 | Jensen | F03D 80/50 |
| | | | | 427/427.3 |
| 2012/0168252 | A1* | 7/2012 | Bogaert | F03D 80/50 |
| | | | | 182/112 |
| 2012/0192400 | A1* | 8/2012 | Malaschewski | E04G 3/30 |
| | | | | 29/428 |
| 2012/0325581 | A1* | 12/2012 | Gunther | F03D 80/50 |
| | | | | 182/129 |
| 2013/0318789 | A1 | 12/2013 | Gabeiras | |
| 2014/0360015 | A1* | 12/2014 | Lohan | B66C 23/207 |
| | | | | 29/889.1 |
| 2015/0135459 | A1* | 5/2015 | Lee | F03D 80/55 |
| | | | | 15/246 |
| 2015/0232307 | A1* | 8/2015 | Holloway | F03D 80/50 |
| | | | | 414/800 |
| 2017/0002797 | A1* | 1/2017 | Chen | F03D 7/0296 |
| 2017/0045030 | A1* | 2/2017 | Senthoorpandian | F03D 13/10 |
| 2017/0121155 | A1* | 5/2017 | Westergaard | F03D 1/0691 |
| 2018/0087490 | A1* | 3/2018 | Fraughton | B08B 3/024 |
| 2018/0283359 | A1* | 10/2018 | Senthoorpandian | F03D 80/50 |
| 2019/0249649 | A1* | 8/2019 | Bjerge | F03D 80/55 |
| 2020/0171552 | A1 | 6/2020 | Lebo | |

FOREIGN PATENT DOCUMENTS

| | | | | | |
|---|---|---|---|---|---|
| DE | 19726408 | C1 | * | 3/1999 | B66F 11/04 |
| DE | 10318675 | B4 | * | 11/2007 | B66F 11/04 |
| DE | 102008019680 | A1 | * | 11/2009 | F03D 80/55 |
| EP | 1706636 | | | 4/2006 | |
| EP | 2394947 | | | 12/2011 | |
| JP | 58-2186 | | | 1/1983 | |
| JP | H5-285880 | | | 11/1993 | |
| JP | H6-090885 | | | 4/1994 | |
| JP | 2004-293455 | | | 10/2004 | |
| JP | 2004293182 | A | * | 10/2004 | E04G 3/24 |
| JP | 2008-128252 | | | 6/2008 | |
| JP | 2008-178953 | | | 7/2008 | |
| JP | 2008-309098 | | | 12/2008 | |
| JP | 2012-007525 | | | 1/2012 | |
| KR | 101324977 | B1 | * | 11/2013 | |
| KR | 20140001444 | A | * | 1/2014 | |
| KR | 101368675 | | | 3/2014 | |
| KR | 101368675 | B1 | * | 3/2014 | |
| SE | 536574 | C2 | * | 9/2012 | F03D 80/50 |
| SE | 536574 | | | 4/2014 | |
| WO | WO2008061797 | | | 5/2008 | |
| WO | WO2009080047 | A2 | | 7/2009 | |
| WO | WO2013102460 | | | 7/2013 | |

OTHER PUBLICATIONS

KR-20140001444-A Machine Translation (Year: 2014).*
DE-102008019680-A1 Machine Translation (Year: 2009).*
SE536574C2 Machine Translation (Year: 2012).*
DE-10318675-B4 Machine Translation (Year: 2007).*
DE-19726408-C1 Machine Translation (Year: 1999).*
JP-2004293182-A machine translation (Year: 2004).*
KR101324977B1 machine translation (Year: 2013).*
Korean Patent Application KR101368675, Machine Translation, (2011) (26 pages).
Korean Patent Publication KR101368675, Machine Translation, (2011) (26 pages).

* cited by examiner

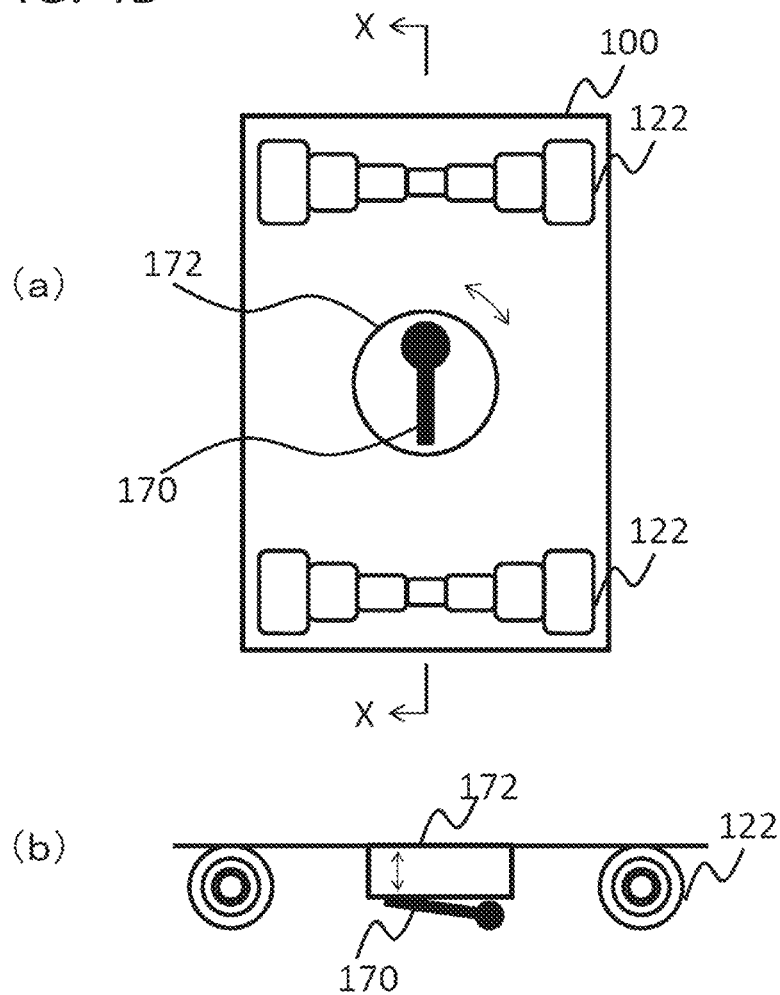

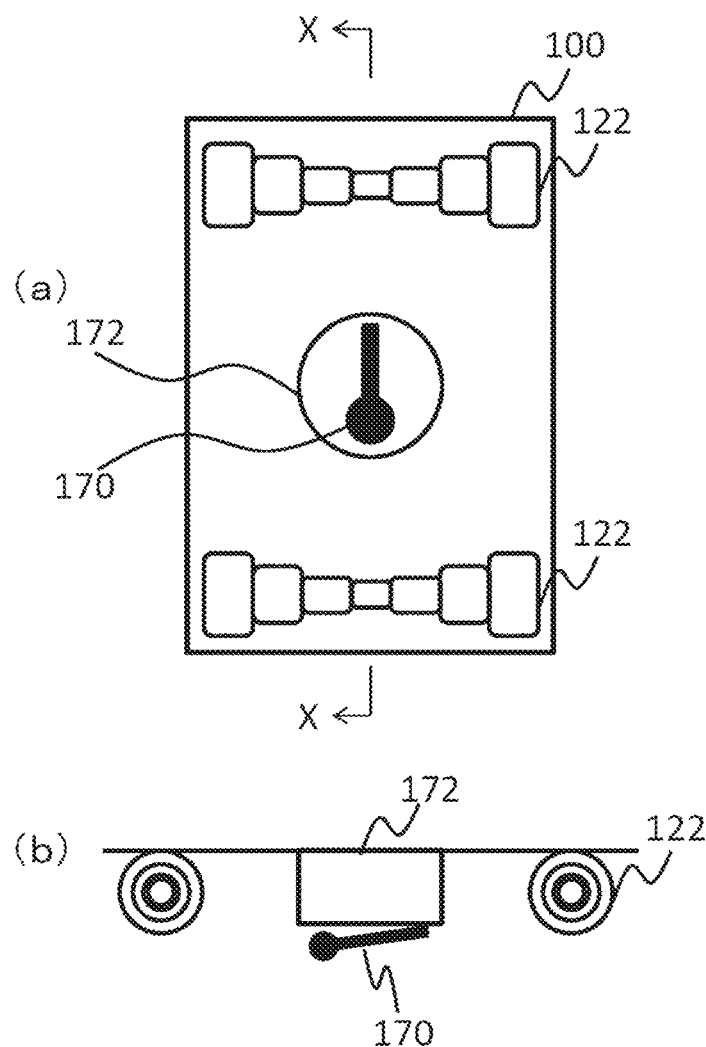

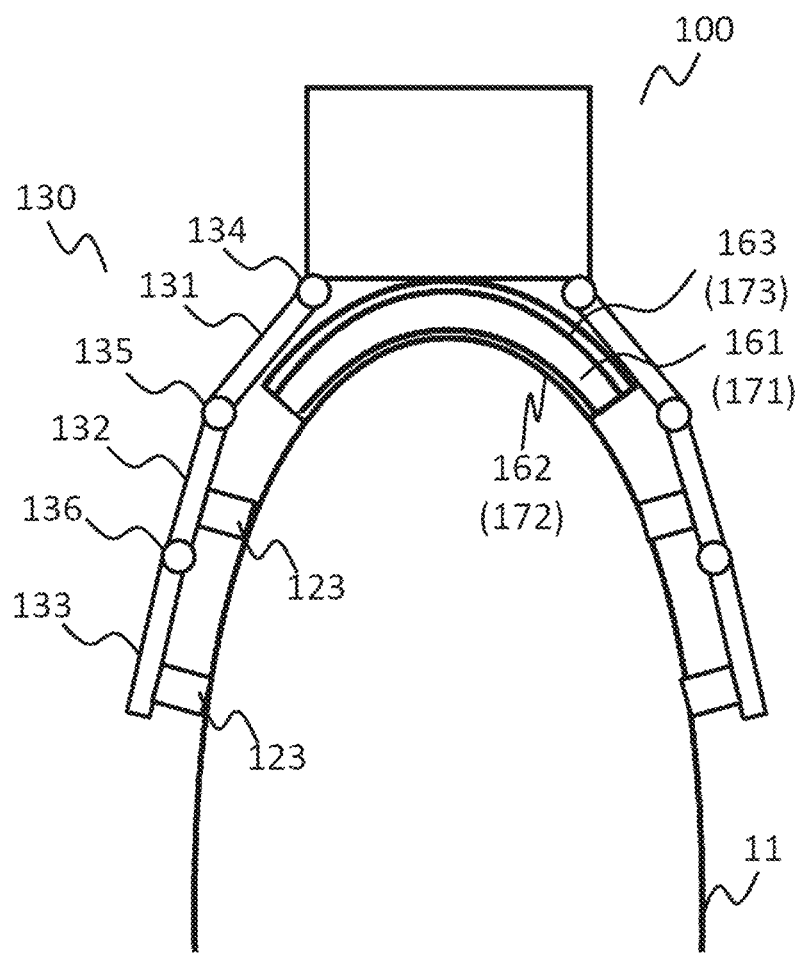

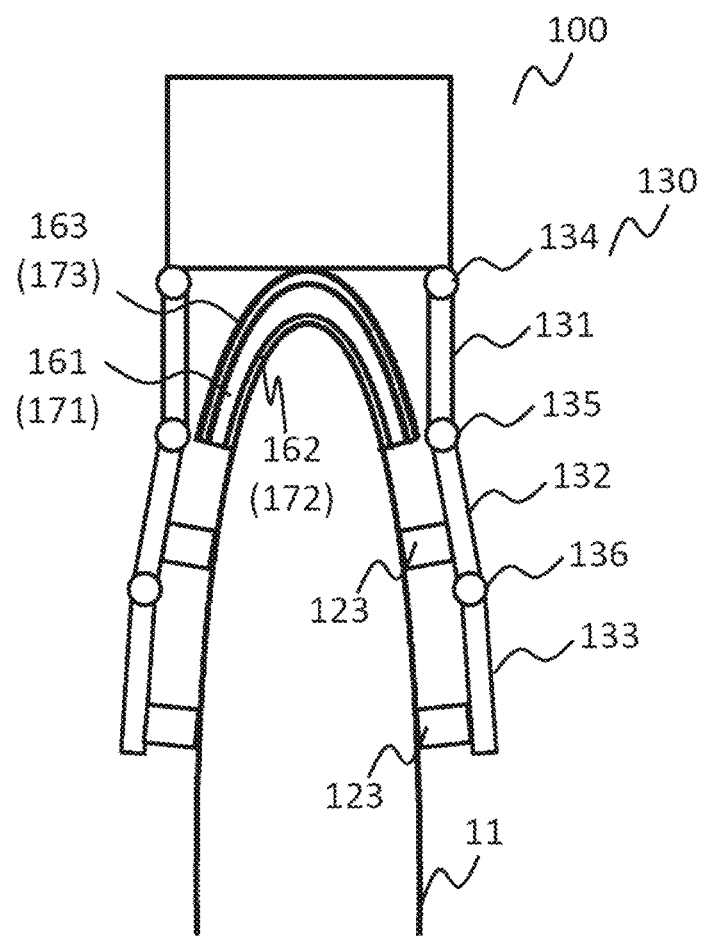

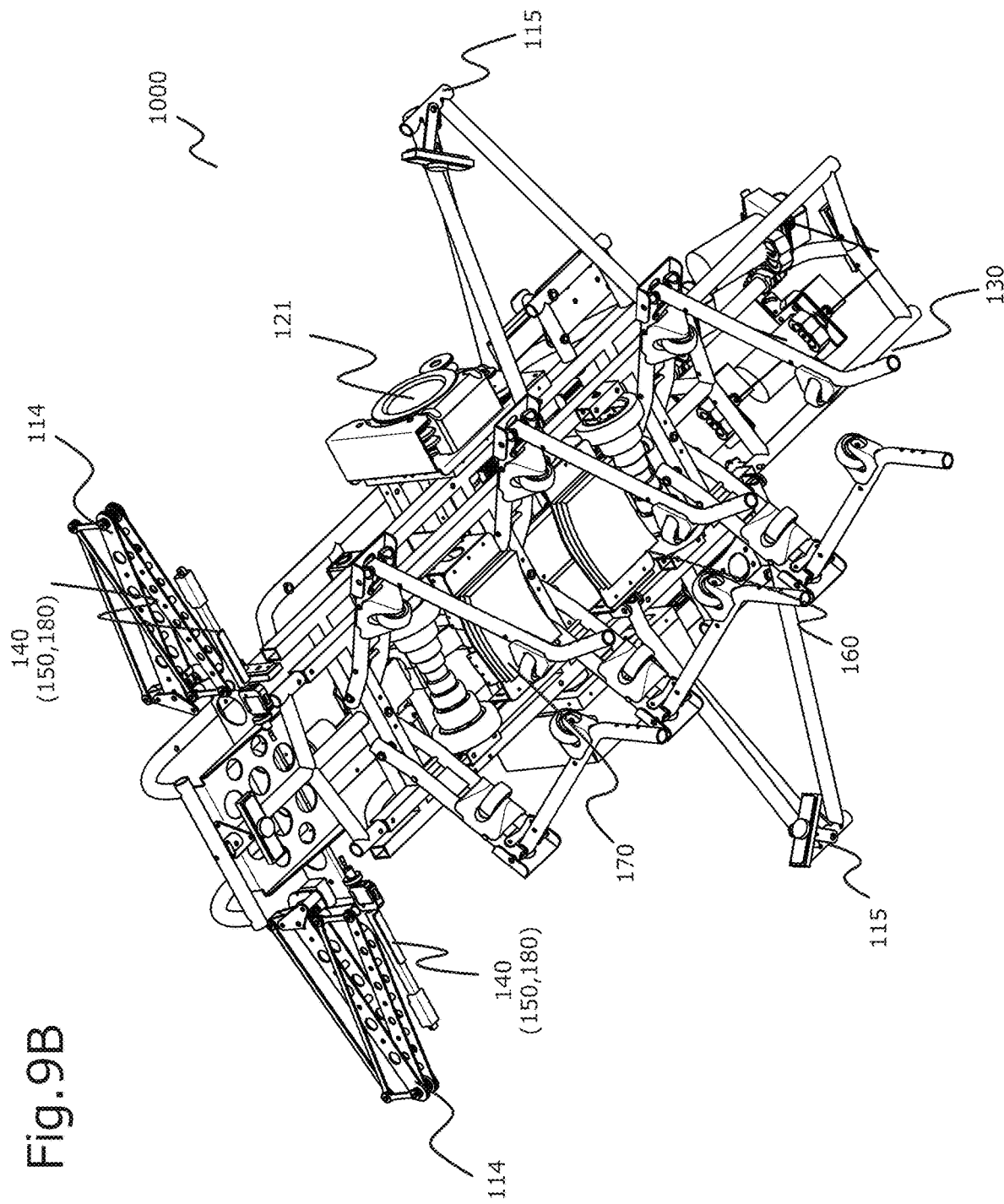

DEVICE, SYSTEM, AND METHOD FOR PERFORMING MAINTENANCE ON OBJECT

CROSS-REFERENCE TO RELATED APPLICATIONS

This application is a continuation of U.S. patent application Ser. No. 16/488,557, filed Aug. 23, 2019 which was a United States National Phase Application filed under 35 U.S.C. § 371 from International Patent Application No. PCT/JP2018/007197, filed on Feb. 27, 2018, which claims priority from Japanese Patent Application Nos. 2017-035323, filed on Feb. 27, 2017, and 2017-142289, filed Jul. 21, 2017. The contents and disclosures of each of these applications are incorporated by reference herein in their entireties.

TECHNICAL FIELD

The present invention relates to a device, system, and method for performing maintenance on an object.

BACKGROUND ART

A large wind power generator has a height of about 100 m. The peripheral speed of a wing tip of a blade of a large wind power generator is about 100 to 120 m/s, and a leading edge (front edge) of a blade, which is an edge cutting through the air, is worn away at a rate of about 20 μm per year. Further, a blade of a large wind power generator is subject to lightning damage. Thus, a blade is equipped with a lightning receiving portion for making lightning stroke current flow to the ground as lightning resistant measures. However, when a lightning receiving portion has conduction failure, a blade is broken due to a stroke of lightning. Therefore, a blade of a large wind power generator requires regular maintenance.

There are three representative methods for performing maintenance on a blade of an existing large wind power generator. The first method is a method in which a large crane is used to remove a blade and put it down on the ground, and then maintenance is performed. The second method is a method in which a gondola is suspended from the tip of a large crane, and a worker riding the gondola performs maintenance. The third method is a method in which a worker moves on a blade along a rope stretched over the blade and performs maintenance.

Since the first method and the second method use a large crane, said methods require much cost and labor. Especially, the first method requires enormous cost and a long construction period due to a step of removing a blade and a step of attaching the blade. The second method and the third method are dangerous because said methods require a worker to work at a high place.

Patent Literature 1 discloses a method for performing maintenance on a blade of a large wind power generator without using a large crane. The maintenance method of Patent Literature 1 still requires a worker to work at a high place.

CITATION LIST

Patent Literature

[PTL 1] Japanese Laid-Open Publication No. 2012-7525

SUMMARY OF INVENTION

Technical Problem

The objective of the present invention is to provide a device, system, and method for inexpensively and safely performing maintenance on an object.

Further, the present invention also has an objective to enable performing maintenance on an object in accordance with change in the shape of an object.

Furthermore, the present invention also has an objective to provide a method for operating a robot located away from an operator by tension.

Solution to Problem

The device for performing maintenance on an object of the present invention comprises an attaching means that enables the device to attach to a part of an object, the attaching means being configured to deform in accordance with a shape of the part of the object, a moving means that enables the device to move on the object, and a maintenance means that performs maintenance on the object.

In one embodiment, the attaching means is configured so that the device maintains a state of attaching to the part of the object by the deformation of the attaching means even when a shape of the part of the object changes in association with the movement.

In one embodiment, the attaching means comprises at least a first frame and a second frame, the first frame and the second frame are pivotably coupled to each other, and the first frame and the second frame deform in accordance with a shape of the part of the object.

In one embodiment, the moving means and the maintenance means cooperate to perform maintenance on the object during movement of the device on the object.

In one embodiment, the maintenance means comprises a means for imaging a surface of the object.

In one embodiment, the maintenance means comprises at least one of a means for examining conduction of a lightning receiving portion of the object, a means for washing a surface of the object, a means for polishing a surface of the object, and a means for applying a material to a surface of the object.

In one embodiment, the maintenance means comprises a means for polishing a surface of the object, and the means for polishing a surface of the object is mounted on a body of the device.

In one embodiment, the means for polishing a surface of the object comprises a polishing portion and an adjusting portion that adjusts a position of the polishing portion.

In one embodiment, the device further comprises a manipulator, the maintenance means comprises a means for polishing a surface of the object, and the means for polishing a surface of the object is mounted on a tip of the manipulator.

In one embodiment, the moving means enables the device to move on the object along a rope stretched over the object.

The moving means is two winches attached to both sides of the device.

The two winches have a first mode in which the two winches are independently controlled and a second mode in which the two winches are controlled in synchronization.

In one embodiment, the object is a part of a structure comprising a second object different from the object, and the device further comprises a second moving means that enables the device to move on the second object.

In one embodiment, the object is a wing body, and a part of the object is a leading edge of a wing body.

In one embodiment, the wing body is a blade of a wind turbine.

The system for performing maintenance on an object of the present invention comprises a body, an attaching means that enables the body to attach to a part of an object, the attaching means being configured to deform in accordance with a shape of the part of the object, a moving means that enables the body to move on the object, and a maintenance means for performing maintenance on the object.

The method for performing maintenance on an object of the present invention comprises stretching at least one rope over an object, attaching a device for performing maintenance on an object onto the object, moving the device on the object along a direction in which the at least one rope is stretched, and causing the device to perform maintenance on the object during movement of the device along a direction in which the at least one rope is stretched, wherein said attaching a device for performing maintenance on an object onto the object comprises connecting the at least one rope to the device.

In one embodiment, moving the device comprises moving the device along an inclined surface of the object.

In one embodiment, moving the device comprises moving the device on the object in a first direction along a direction in which the at least one rope is stretched, and moving the device on the object in a second direction different from the first direction along a direction in which the at least one rope is stretched, wherein causing the device to perform the maintenance comprises causing the device to perform first maintenance during movement of the device in the first direction, and causing the device to perform second maintenance different from the first maintenance during movement of the device in the second direction.

In one embodiment, at least two ropes are connected to the device, and the attaching comprises attaching the device onto the object while using the at least two ropes to control a posture of the device.

In one embodiment, using the at least two ropes to control a posture of the device is performed by a worker.

In one embodiment, using the at least two ropes to control a posture of the device is performed by a movable robot.

In one embodiment, each step of the method is performed by a robot.

In one embodiment, at least one rope stretched over the object is two ropes, and the device comprises two winches to which the two ropes are connected on both sides of the device.

In one embodiment, the two winches have a first mode in which the two winches are independently controlled and a second mode in which the two winches are controlled in synchronization, connecting the ropes to the device comprises actuating the two winches in the first mode, and moving the device comprises actuating the two winches in the second mode.

In one embodiment, the object is a wing body, and a part of the object is a leading edge of a wing body.

In one embodiment, the wing body is a blade of a wind turbine.

The present invention provides a method for operating a robot, wherein at least two ropes are connected to the robot, and the method comprises using the at least two ropes to operate the robot.

Advantageous Effects of Invention

According to the present invention, it is possible to provide a device, system, and method for inexpensively and safely performing maintenance on an object.

Further, according to the present invention, it is possible to enable performing maintenance on an object in accordance with change in the shape of an object.

Furthermore, according to the present invention, it is possible to provide a method for operating a robot located away from an operator by tension.

BRIEF DESCRIPTION OF DRAWINGS

FIG. 4D A figure showing another example of a polishing means 170 attached to a body of a device 100.

FIG. 4E A figure showing another example of a polishing means 170 attached to a body of a device 100.

FIG. 5A A figure showing a state in which a device 100 for performing maintenance on a blade of a wind turbine attaches to a thick blade.

FIG. 5B A figure showing a state in which a device 100 for performing maintenance on a blade of a wind turbine attaches to a thin blade.

FIG. 9B A bottom side perspective view of a device 1000.

DESCRIPTION OF EMBODIMENTS

The embodiments of the present invention are explained hereinafter with reference to the drawings.

1. Maintenance on a Blade of a Wind Turbine

Figure 1A:
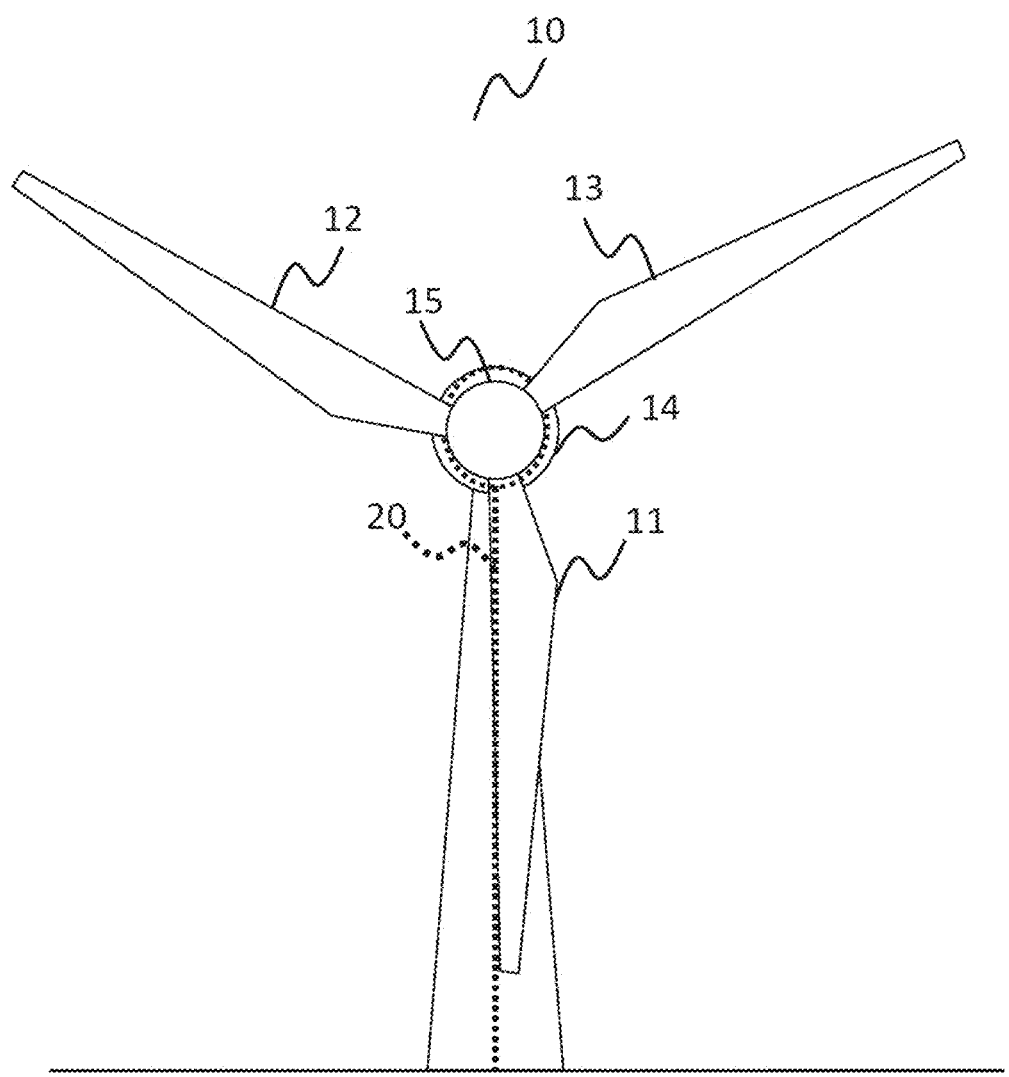
FIG. 1A A figure showing the state of a preparation stage before attaching a device 100 to a blade 11 of a wind turbine 10.
Figure 1B:
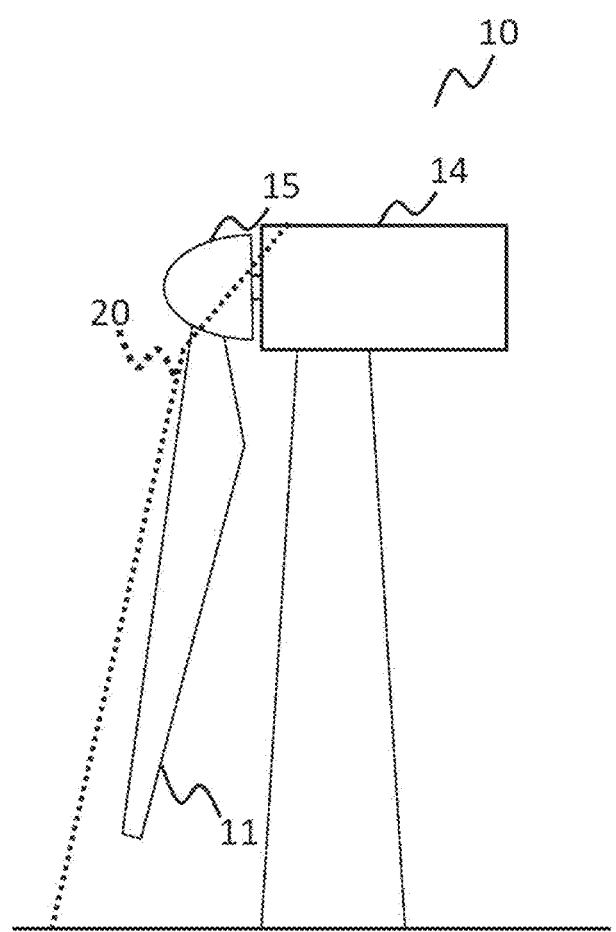
FIG. 1B A figure showing the state of a preparation stage before attaching a device 100 to a blade 11 of a wind turbine 10.
Figure 2A:
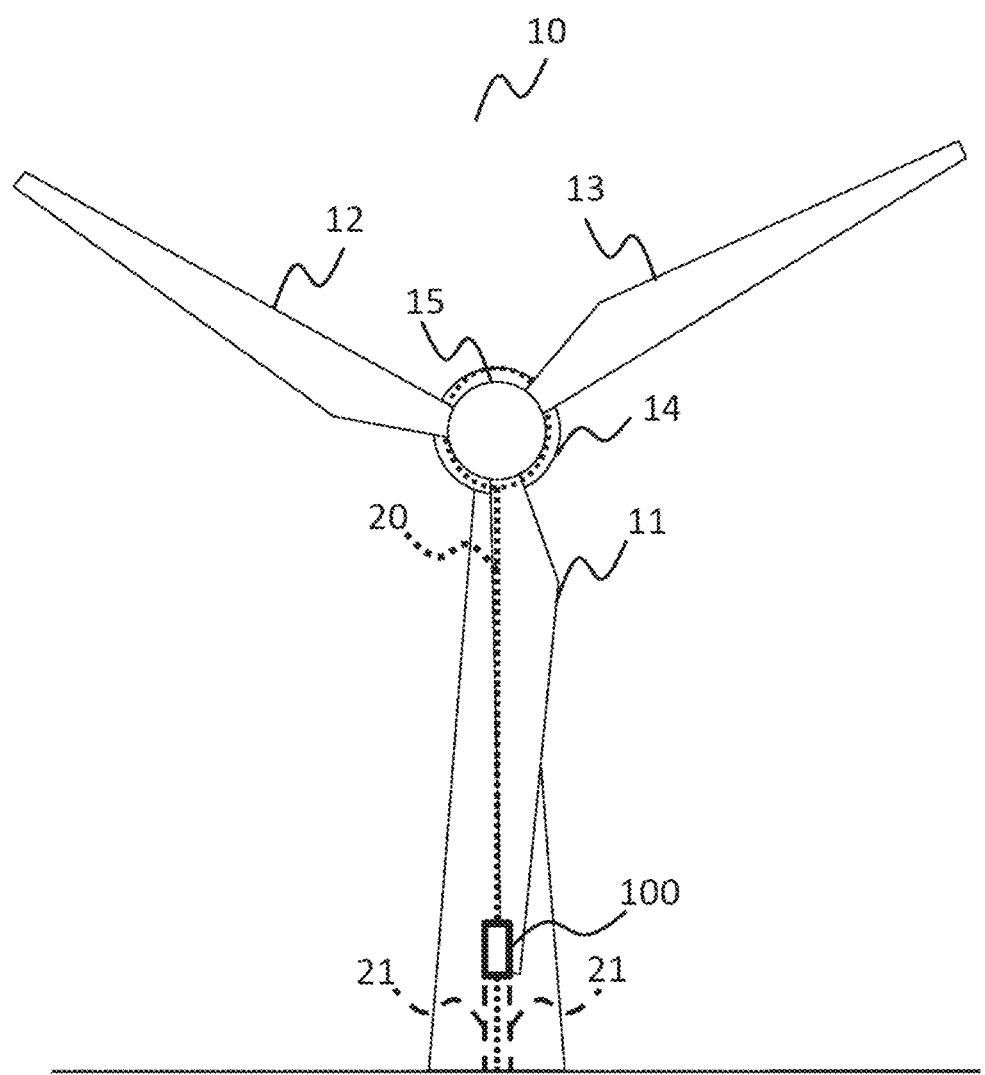
FIG. 2A A figure showing the state of a stage for attaching a device 100 for performing maintenance on a blade of a wind turbine to a blade 11 of a wind turbine 10.
Figure 2B:
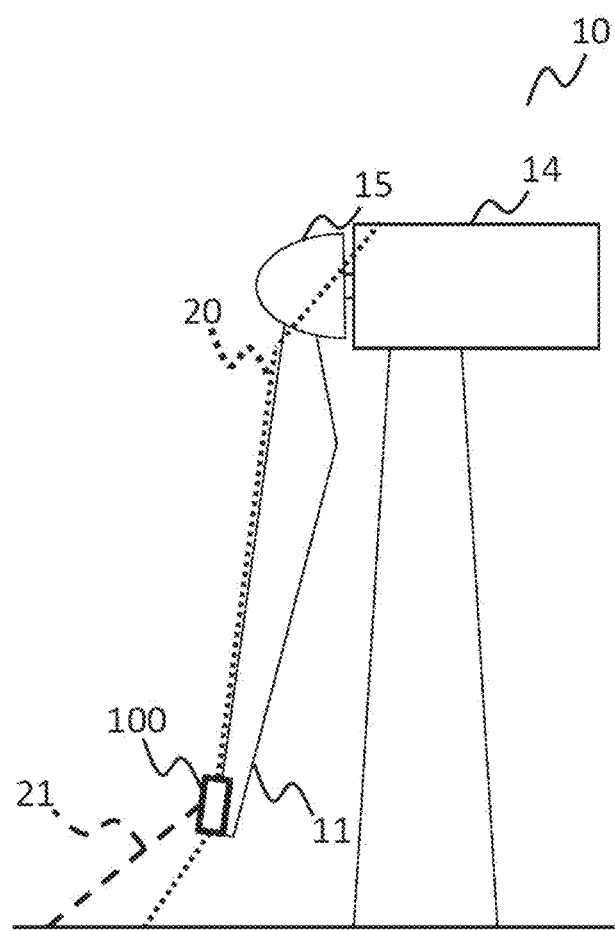
FIG. 2B A figure showing the state of a stage for attaching a device 100 for performing maintenance on a blade of a wind turbine to a blade 11 of a wind turbine 10.
Figure 3A:
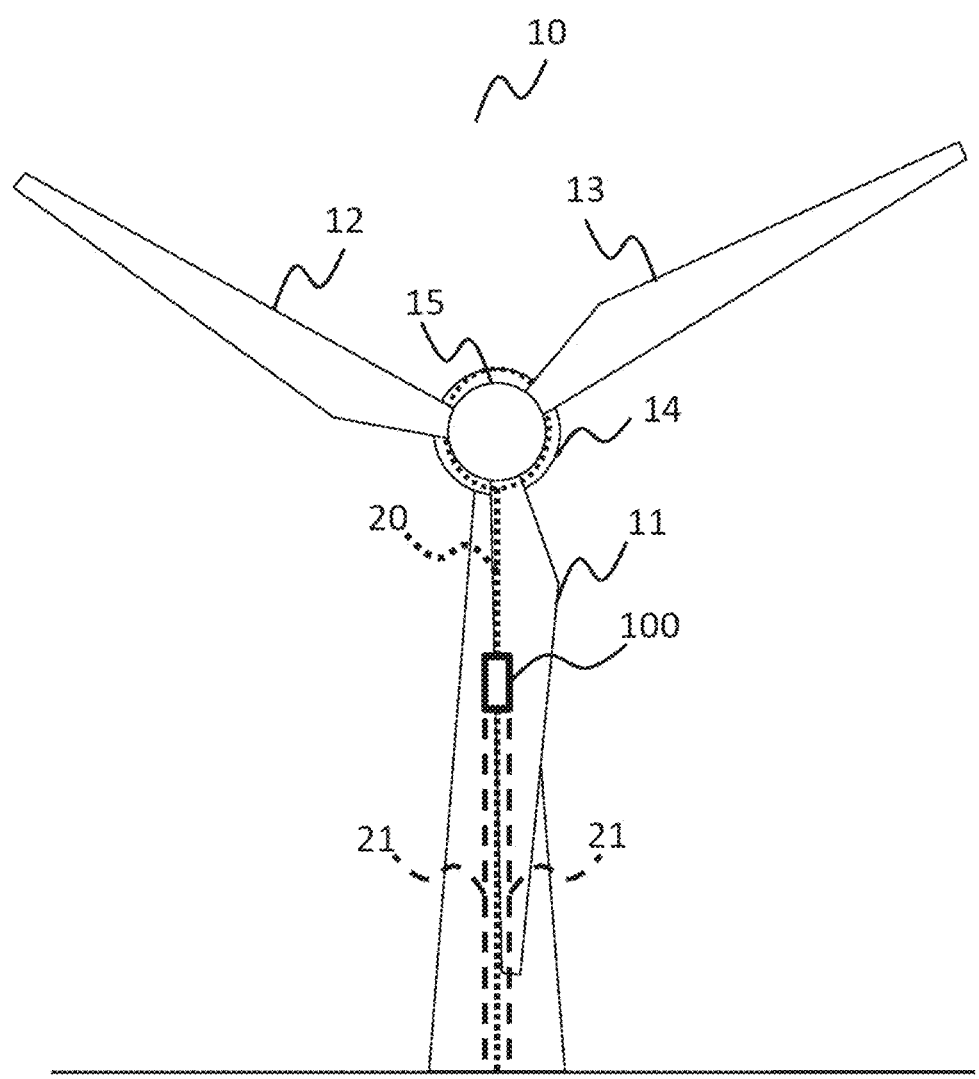
FIG. 3A A figure showing a state in which a device 100 for performing maintenance on a blade of a wind turbine moves on a leading edge of a blade 11 along a rope 20.
Figure 3B:
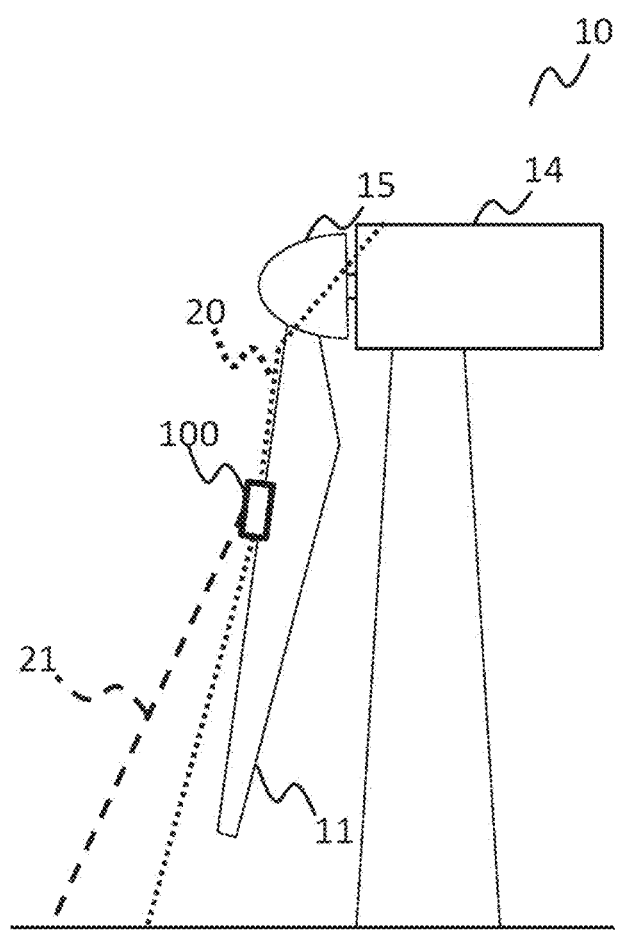
FIG. 3B A figure showing a state in which a device 100 for performing maintenance on a blade of a wind turbine moves on a leading edge of a blade 11 along a rope 20.

FIG. 1 to FIG. 3 are used to explain a state in which a device 100 for performing maintenance on a blade of a wind turbine performs maintenance on a blade 11 of a wind turbine 10. FIG. 1A, FIG. 2A, and FIG. 3A show the front of the wind turbine 10, and FIG. 1B, FIG. 2B, and FIG. 3B show the right side of the wind turbine 10. FIG. 1B, FIG. 2B, and FIG. 3B only show the blade 11 subjected to maintenance, in which the other two blades 12 and 13 are omitted. The wind turbine shown in FIG. 1A, FIG. 2A, and FIG. 3A is a wind turbine that rotates clockwise on the drawings, in which a linear edge of each blade is a leading edge (front edge).

As used herein, "wind turbine" refers to a device that obtains motive power by the wind. One example of a wind turbine is a wind power generator.

As used herein, "maintenance" refers to inspection or conservation of an object. One example of maintenance is imaging the surface of an object, examining the conduction of a lightning receiving portion of an object, washing the surface of an object, polishing the surface of an object, applying paint to the surface of an object, applying a material such as putty, adhesive, and sealant to the surface of an object, or the like.

FIG. 1A and FIG. 1B show the state of a preparation stage before attaching the device 100 to the blade 11 of the wind turbine 10.

Maintenance on the blade 11 is performed while the blade 11 is positioned so that the blade 11 extends vertically downwards. Since this is the same state as the state of a blade in a conventional method in which a worker moves on a blade along a rope stretched over the blade and performs maintenance, this state is readily accepted in existing work sites. When the blade 11 is positioned so as to extend vertically downwards, the leading edge is inclined by about 5 degrees relative to the vertical direction as shown in FIG. 1B.

A rope 20 is fixed to a nacelle 14 of the wind turbine 10 in a preparation stage before attaching the device 100 to the blade 11 of the wind turbine 10. The nacelle 14 is a case housing a generator, a gear box or the like. The rope 20 is fixed to, for example, a hatch of the nacelle 14 (see FIG. 16). The rope 20 extends from the nacelle 14 of the wind turbine 10 to the leading edge at the base of the blade 11 while going around a hub 15, and extends, over the leading edge of the blade 11, from the leading edge at the base of the blade 11 to the ground. The hub 15 is a member which rotatably couples the blades 11, 12, and 13 and the nacelle 14.

FIG. 2A and FIG. 2B show the state of a stage for attaching the device 100 for performing maintenance of a blade of a wind turbine to the blade 11 of the wind turbine 10.

The device 100 comprises a winch (not shown in FIG. 1 to FIG. 3). The winch of the device 100 is connected with the rope 20. One end of the rope 20 is fixed to the ground by a weight or the like. The device 100 can rise along the rope 20 by using the winch to wind the rope 20.

Two ropes 21 are connected near the center of gravity of the device 100 for controlling the posture of the device 100. The two ropes 21 extend to the ground and are held by a worker on the ground. The worker can control the rotation of the device 100 by appropriately adjusting the tension of the two ropes 21 as if, for example, navigating a sport kite. For example, when the device 100 is inclined to the right while rising along the rope 20 as shown in FIG. 2A, it is possible to correct the posture of the device 100 by pulling the rope 21 on the left side. For example, when the device 100 is inclined to the left while rising along the rope 20 as shown in FIG. 2A, it is possible to correct the posture of the device 100 by pulling the rope 21 on the right side.

Once the device 100 rises to the leading edge at the tip of the blade 11, the device 100 attaches to the leading edge at the tip of the blade 11. The device 100 attaches to the leading edge at the tip of the blade 11 by using an attaching means 130 described below.

FIG. 3A and FIG. 3B show a state in which the device 100 for performing maintenance on a blade of a wind turbine moves on the leading edge of the blade 11 along the rope 20.

When the device 100 moves along the leading edge, the device 100 maintains an attached state by the attaching means 130 described below. This enables the device 100 to move on the leading edge of the blade 11 without floating up. Further, since the leading edge of the blade 11 is inclined by about 5 degrees relative to the vertical direction as described above, the gravity acting on the device 100 acts so as to push the device 100 against the leading edge of the blade 11 and prevents the device 100 from floating up. Furthermore, since the posture of the device 100 is maintained by the attaching means 130 during the movement, the posture does not need to be controlled by the two ropes 21.

The device 100 performs maintenance while moving on the leading edge of the blade 11. For example, the device 100 images the surface of the leading edge by using a camera while moving on the leading edge of the blade 11. For example, the device 100 examines the conduction of a lightning receiving portion by using a probe while moving on the leading edge of the blade 11. For example, the device 100 washes the surface of the leading edge by using a washing device while moving on the leading edge of the blade 11. For example, the device 100 polishes the surface of the leading edge by using a sander while moving on the leading edge of the blade 11. For example, the device 100 applies paint to the surface of the leading edge by using a paint applying device while moving on the leading edge of the blade 11. For example, the device 100 applies a material such as putty, adhesive, and sealant to the surface of the leading edge by using an electric gun while moving on the leading edge of the blade 11. A hole made in the blade 11 can be filled with an applied material. The objective of filling a hole is to cover the hole to prevent water from entering the blade 11. Aesthetics or perfection do not need to be required.

The device 100 can move on the leading edge of the blade 11 in two directions in which the rope extends by controlling winding and delivering by the winch. This enables the device 100 to perform maintenance while reciprocatively moving on the leading edge of the blade 11. Further, even if the device 100 comes off the blade 11, the rope 20 to which the winch of the device 100 is connected serves as a lifeline, which can prevent the device 100 from falling down.

Figure 4A:
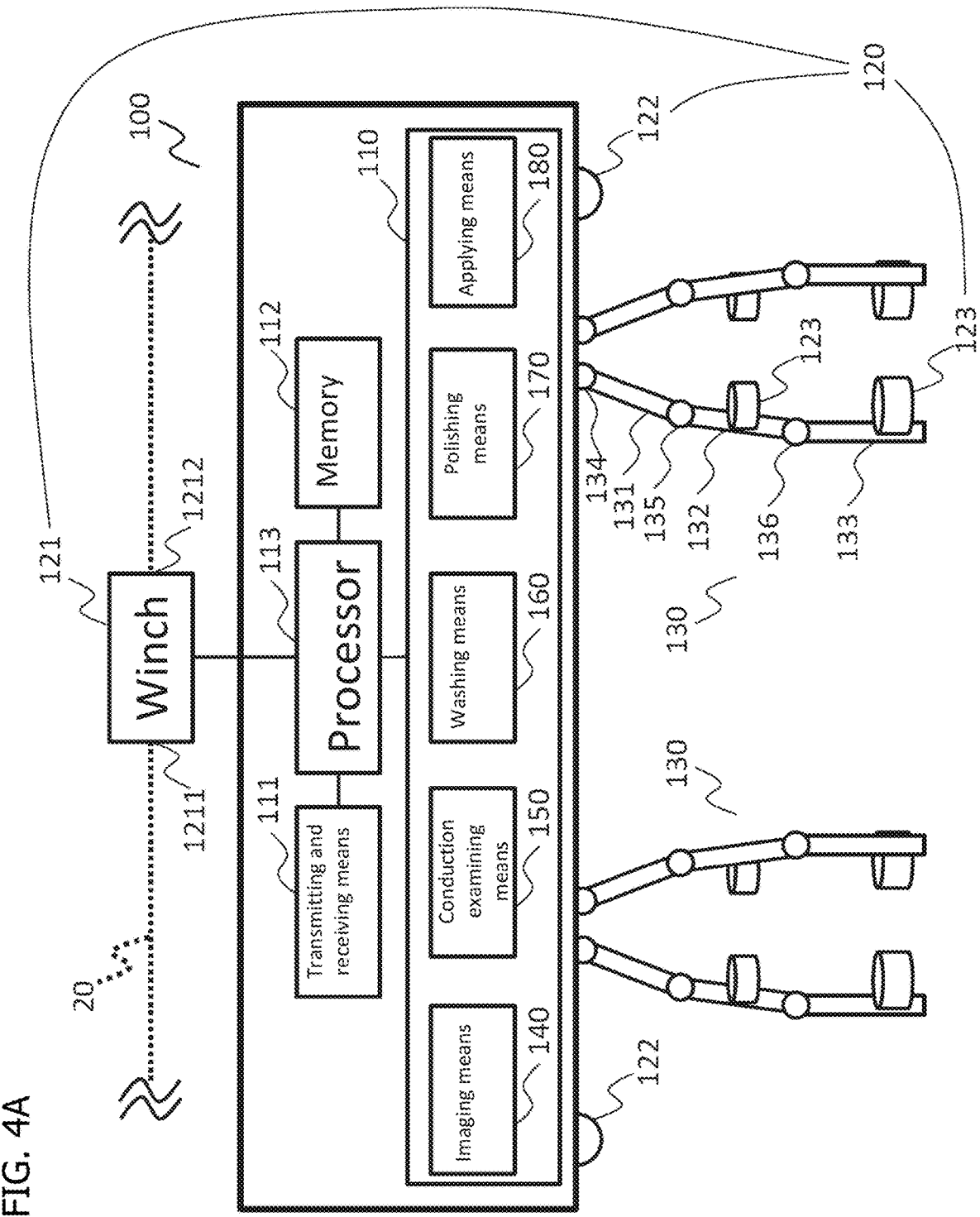
FIG. 4A A figure showing one example of a configuration of a device 100 for performing maintenance on a blade of a wind turbine.

2. Configuration of a Device for Performing Maintenance on a Blade of a Wind Turbine FIG. 4A shows one example of a configuration of a device 100 for performing maintenance on a blade of a wind turbine.

The device 100 comprises a maintenance means 110, a transmitting and receiving means 111, a memory 112, a processor 113, a moving means 120, and an attaching means 130.

The maintenance means 110 is a means for performing maintenance on a blade of a wind turbine. The maintenance means comprises, for example, an imaging means 140, a conduction examining means 150, a washing means 160, a polishing means 170, and an applying means 180. The maintenance means 110 may comprise at least one of, for example, the imaging means 140, the conduction examining means 150, the washing means 160, the polishing means 170, and the applying means 180. For example, the maintenance means 110 may comprise the imaging means 140 for inspection. For example, the maintenance means 110 may comprise at least one of the imaging means 140, the conduction examining means 150, the washing means 160, the polishing means 170, and the applying means 180 for inspection and conservation.

The imaging means 140 can be any camera that is able to image a still picture or movie of an object.

The conduction examining means 150 can be any means that is able to examine whether current flows in a conducting portion. For example, the conduction examining means 150 comprises a probe that is able to examine whether current flows in a lightning receiving portion provided to a blade of a wind turbine.

The washing means 160 can be any means that is able to wash an object. For example, the washing means 160 may be a mechanism that uses washing liquid and rag to wipe off dirt. When such a mechanism is used to wash a blade 11 of a wind turbine 10 while moving on the blade 11 of the wind turbine 10 as shown in FIG. 1 to FIG. 3, washing is performed by the device 100 moving on the blade while pushing the rag against the blade.

The polishing means 170 can be any means that is able to polish an object. For example, the polishing means 170 may be a mechanism that uses a sand paper, a grinder, a disk grinder or the like for polishing. When a sand paper is used to polish the blade 11 of the wind turbine 10 while moving on the blade 11 of the wind turbine 10 as shown in FIG. 1 to FIG. 3, polishing is performed by the device 100 moving on the blade while pushing the sand paper against the blade. When a grinder, a disk grinder or the like is used to polish the blade 11 of the wind turbine 10 while moving on the blade 11 of the wind turbine 10 as shown in FIG. 1 to FIG. 3, polishing is performed by pushing the rotating grinder against the blade 11. When the polishing means 170 is a power tool such as a grinder or a disk grinder, it is preferable that the polishing means 170 is attached to the body of the device 100. That is because attaching the polishing means 170 to the body of the device 100 enables the body with a large mass to absorb reaction that is generated when the polishing means 170 is pushed against the blade 11. Mechanisms shown in FIG. 4B to FIG. 4E may be used to attach the polishing means 170 to the body of the device 100.

Figure 4B:
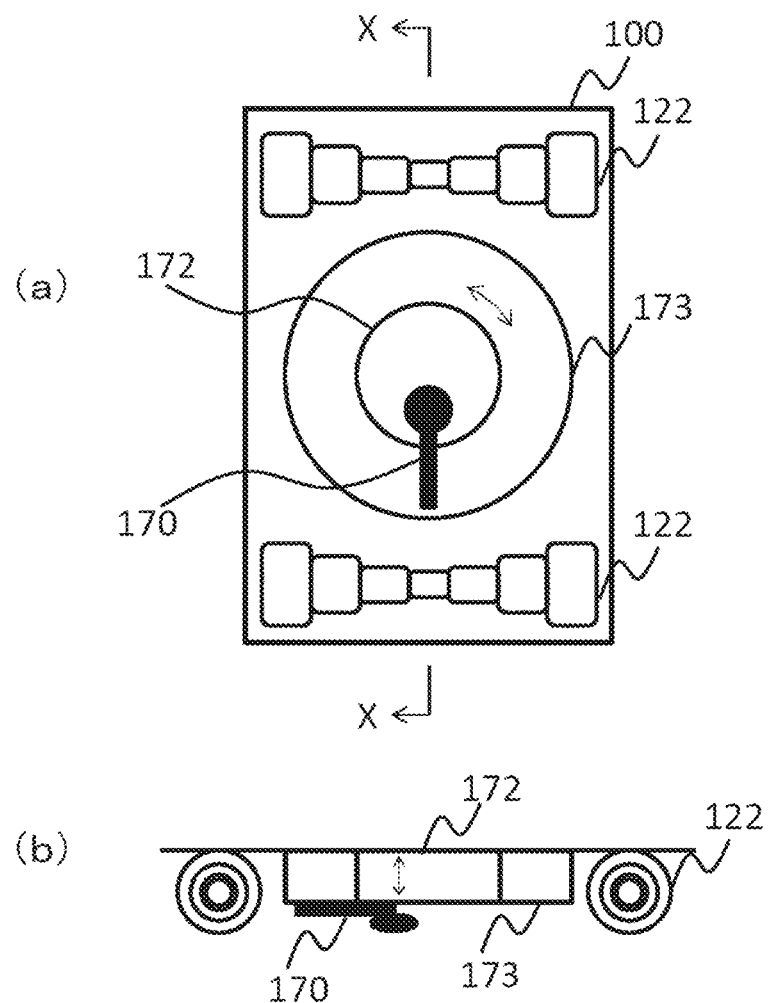
FIG. 4B A figure showing one example of a polishing means 170 attached to a body of a device 100.
Figure 4C:
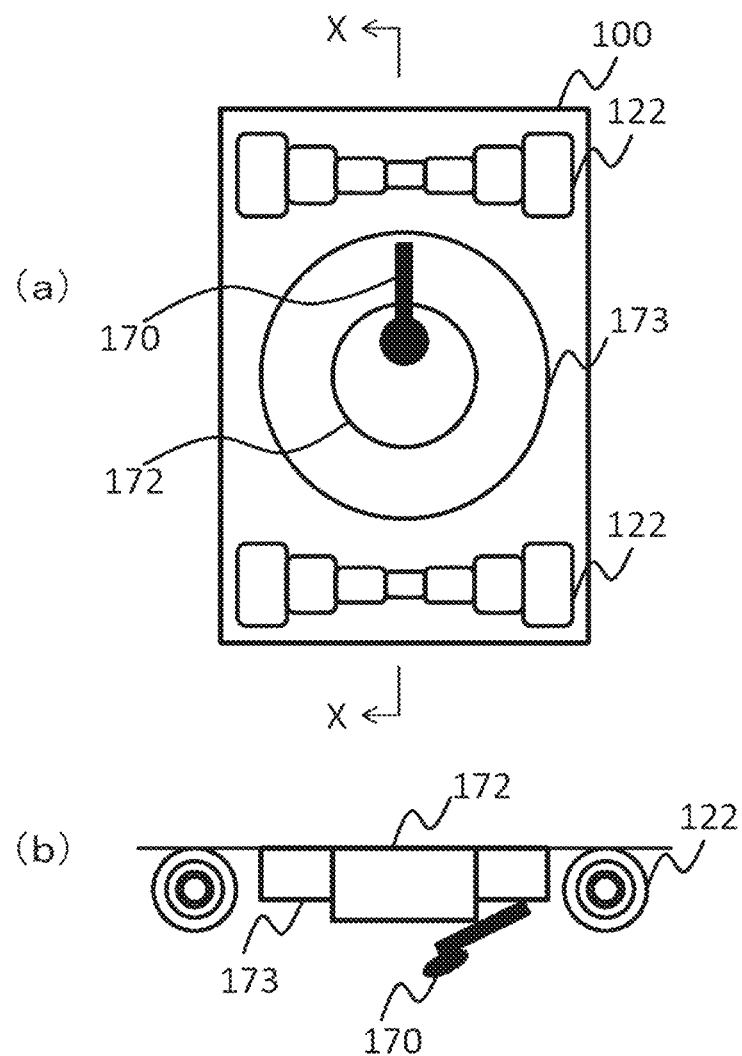
FIG. 4C A figure showing another example of a polishing means 170 attached to a body of a device 100.

FIG. 4B to FIG. 4C show one example of the polishing means 170 attached to the body of the device 100. FIG. 4D to 4E show another example of the polishing means 170 attached to the body of the device 100. FIG. 4B(a), FIG. 4C(a), FIG. 4D(a), and FIG. 4E(a) are figures schematically showing the bottom of the device 100. FIG. 4B(b), FIG. 4C(b), FIG. 4D(b), and FIG. 4E(b) are X-X line cross sectional view of FIG. 4B(a), FIG. 4C(a), FIG. 4D(a), and FIG. 4E(a), respectively.

As shown in FIG. 4B and FIG. 4C, the device 100 comprises an adjusting portion (circular portion 172 and ring portion 173) in order to attach the polishing means 170 (e.g., a disk grinder) to the body in such a manner that the position can be adjusted. The polishing means 170 is attached to both the circular portion 172 and the ring portion 173. The circular portion 172 and the ring portion 173 are each rotatable in the arrow direction in FIG. 4B(a). The circular portion 172 and the ring portion 173 may be independently rotatable, or concurrently rotatable. The circular portion 172 is further expandable in the arrow direction in FIG. 4B(b).

For example, a disk grinder needs to push the edge of the disk for polishing in order to perform polishing with a rotating disk. However, when, for example, the surface of a recessed portion on a blade is polished, the edge of the disk may not reach the surface of the recessed portion. In this case, as shown in FIG. 4C(b), it is possible to adjust the expansion direction position of the disk grinder by expansion of the circular portion 172, thereby it is possible to form an angle in the disk grinder, which enables polishing the surface of the recessed portion as well. Further, as shown in FIG. 4C, it is possible to adjust the rotation direction position of the disk grinder by rotation of the circular portion 172 and the ring portion 173. The position of the disk grinder can be finely adjusted by expansion of the circular portion 172 and rotation of the circular portion 172 and the ring portion 173.

As shown in FIG. 4D and FIG. 4E, the device 100 comprises an adjusting portion (circular portion 172) in order to attach the polishing means 170 (e.g., a grinder) to the body in such a manner that the position can be adjusted. The polishing means 170 is attached to the circular portion 172. The circular portion 172 is rotatable in the arrow direction in FIG. 4D(a). The circular portion 172 is further expandable in the arrow direction in FIG. 4D(b).

For example, since a grinder performs polishing with a rotating sphere, the grinder needs to push the sphere for polishing. However, when, for example, the surface of a recessed portion on a blade is polished, the sphere may not reach the surface of the recessed portion. In this case, as shown in FIG. 4E(b), it is possible to adjust the expansion direction position of the grinder by expansion of the circular portion 172, thereby it is possible to polish the surface of the recessed portion as well. Further, as shown in FIG. 4E, it is possible to adjust the rotation direction position of the grinder by rotation of the circular portion 172. The position of the grinder can be finely adjusted by expansion of the circular portion 172 and rotation of the circular portion 172. Furthermore, an angle does not need to be formed in a grinder that performs polishing with a rotating sphere like a disk grinder because said grinder does not perform polishing with a limited portion such as the edge of a disk like a disk grinder but can perform polishing with a wider portion.

The above-described examples explain attaching a disk grinder to the adjusting portion (circular portion 172 and ring portion 173) shown in FIG. 4B and FIG. 4C. However, a grinder may be attached to the adjusting portion (circular portion 172) shown in FIG. 4B and FIG. 4C.

With reference to FIG. 4A again, the applying means 180 can be any means that is able to apply a material to an object. A material applied by the applying means 180 includes, for example, paint, putty, adhesive, and sealant. For example, the applying means 180 may be a spraying device that is able to spray paint. When such a spraying device is used to apply paint to the blade 11 of the wind turbine 10 while moving on the blade 11 of the wind turbine 10 as shown in FIG. 1 to FIG. 3, the paint is applied by the device 100 moving on the blade while spraying the paint from the spraying device. For example, the applying means 180 may be a caulking gun that is able to extrude putty, adhesive, sealant or the like. When such a caulking gun is used to apply a material such as putty, adhesive, or sealant to the blade 11 of the wind turbine 10 while moving on the blade 11 of the wind turbine 10 as shown in FIG. 1 to FIG. 3, the material is applied by identifying a part to which the material should be applied with the imaging means 140 or the like in advance, moving the device 100 on the blade 11, and extruding the material when the device 100 reaches the part to which the material should be applied.

It should be noted that the maintenance means 110 is not limited to the imaging means 140, the conduction examining means 150, the washing means 160, the polishing means 170, and the applying means 180. The device 100 may comprise another means for performing maintenance on an object as the maintenance means 110 instead of or in addition to the above-described means.

The transmitting and receiving means 111 is a means for receiving a signal from outside the device 100 and transmitting a signal to outside the device 100. The transmitting and receiving means 111 may receive a signal from outside the device 100 by wire or wireless. The transmitting and receiving means 111 may transmit a signal to outside the device 100 by wire or wireless. The transmitting and receiving means 111 receives, for example, a signal for controlling each action of the device 100 from outside the device 100 (e.g., a terminal for operation used by an operator). The transmitting and receiving means 111 transmits, for example, image data obtained by an imaging means to outside the device 100 (e.g., a terminal for operation used by an operator). For example, the transmitting and receiving means 111 may use a LAN interface to communicate with outside the device 100. Since this enables supplying a plurality of types of signals via the LAN interface, it will be easier to remotely operate the device 100.

The memory 112 stores a program necessary for execution of processing of the device 100, data necessary for execution of the program, or the like. The memory 112 can be implemented by any storage means.

The processor 113 controls the action of the whole device 100. For example, the processor 113 controls the action of the moving means 120 or the maintenance means 110 in accordance with a control signal received by the transmitting and receiving means 111. This executes each action for performing maintenance on an object. The processor 113 is also able to read out a program stored in the memory 112, execute the program, and cause the device 100 to function as a device executing a desired step.

Although it was explained that each action for performing maintenance on an object is executed in accordance with a signal from outside the device 100, the present invention is not limited to the above. For example, a program for realizing a series of actions for performing maintenance on an object may be stored in the memory 112, and the processor 113 can read out and execute the program, thereby causing the device 100 to function as a device automatically performing maintenance on an object.

The moving means 120 is a means that enables the device 100 to move on a blade. The moving means 120 comprises, for example, a winch 121, a wheel for travelling on leading edge 122, and a wheel for travelling on blade side surface 123. The device 100 is able to move on a blade in the horizontal direction of FIG. 4A along a rope 20 extending in the horizontal direction of FIG. 4A by, for example, the winch 121, the wheel for travelling on leading edge 122, and the wheel for travelling on blade side surface 123.

The winch 121 can be a mechanism connectable to at least one rope 20. For example, the rope 20 enters the winch 121 from a first end 1211 of the winch 121, is connected to the winch 121, and exits from a second end 1212 of the winch 121. The device 100 moves in the direction of the first end 1211 (left direction in FIG. 4A) by the winch 121 winding the rope 20 so that the rope 20 enters the first end 1211 (delivering the rope 20 from the second end 1212). The device 100 moves in the direction of the second end 1212 (right direction in FIG. 4A) by the winch 121 winding the rope 20 so that the rope 20 enters the second end 1212 (delivering the rope 20 from the first end 1211). The winding action of the winch 121 is controlled by the processor 113. The winch 121 winds the rope 20 in accordance with a control signal from the processor 113.

Although an example in which the rope 20 passes through the winch 121 was explained in the above-described example, the present invention is not limited to this. The scope of the present invention also encompasses a case in which the rope 20 does not pass through the winch 121, that is, a case in which the rope 20 enters from one end of the winch 121 but does not exit from the other end. In this case, the rope 20 does not need to extend between the device 100 and the ground. For example, the device 100 moves in the direction toward a nacelle 14 of a wind turbine by the winch 121 winding a rope extending between the nacelle 14 of the wind turbine and the device 100. For example, the device 100 moves in the direction away from the nacelle 14 of a wind turbine by the winch 121 delivering a rope extending between the nacelle 14 of the wind turbine and the device 100.

The wheel for travelling on leading edge 122 and wheel for travelling on blade side surface 123 are wheels assisting the device 100 to smoothly move when it moves by the winch 121 winding the rope 20. The wheel for travelling on leading edge 122 and wheel for travelling on blade side surface 123 can be non-driving wheels. The wheel for travelling on leading edge 122 and/or wheel for travelling on blade side surface 123 may be configured to be able to calculate the distance of the movement on a blade from the number of revolutions.

It should be noted that the moving means 120 is not limited to the winch 121, wheel for travelling on leading edge 122, and wheel for travelling on blade side surface 123. The device 100 may comprise another means that enables the device 100 to move on an object as the moving means 120 instead of or in addition to the above-described means.

The attaching means 130 is a means that enables the device 100 to attach to a leading edge of a blade. The device 100 can attach to a leading edge of a blade by the attaching means 130. The attaching means 130 is, for example, a pair of frame assemblies, wherein each frame assembly comprises a first frame 131, a second frame 132, a third frame 133, a first hinge 134, a second hinge 135, and a third hinge 136. The first frame 131 is pivotable with the first hinge 134 as an axis, the first frame 131 and the second frame 132 are pivotable with the second hinge 135 as an axis, and the second frame 132 and the third frame 133 are pivotable with the third hinge 136 as an axis. Each hinge is independent, and each frame is independently pivotable.

The attaching means 130 is biased so that a pair of frame assemblies can hold an object therebetween. In this regard, it does not matter how the attaching means 130 is biased. For example, the attaching means 130 may be biased by a spring, the attaching means 130 may be hydraulically biased, or the attaching means 130 may be biased by magnetic force.

Since the attaching means 130 is biased so that each frame is pivotably coupled in a pair of frame assemblies and the pair of frame assemblies hold an object therebetween, the attaching means 130 can deform in accordance with the shape of the object and can fixedly attach to an object even when the shape differs depending on an attachment target or even when the shape of the object changes in association with movement by the moving means 120.

In the example shown in FIG. 4A, two wheels for travelling on leading edge 122 are attached to a body. However, the number and attachment position of wheels for travelling on leading edge 122 do not matter. Any number of wheels for travelling on leading edge 122 can be attached to any place. For example, one wheel for travelling on leading edge 122 may be attached to the first frame 131, and four wheels for travelling on leading edge 122 may be attached to the body.

In the example shown in FIG. 4A, one wheel for travelling on blade side surface 123 is attached to each of the second frame 132 and the third frame 133. However, the number and attachment position of wheels for travelling on blade side surface 123 do not matter. Any number of wheels for travelling on blade side surface 123 can be attached to any place. For example, a plurality of wheels for travelling on blade side surface 123 may be attached to each of the first frame 131, the second frame 132, and the third frame 133.

In the example shown in FIG. 4A, the device 100 comprises two attaching means 130. However, the number of attaching means 130 does not matter. The device 100 can comprise any number of attaching means 130. The device 100 may comprise one attaching means 130, or may comprise three or more attaching means 130. The device 100 can comprise an appropriate number of attaching means 130 in accordance with the total length.

In the example shown in FIG. 4A, two attaching means 130 are not connected to each other, and they independently deform. Since each attaching means 130 thereby deforms in accordance with change in the shape even when the shape of an attachment target changes in the advancing direction of the device 100 (horizontal direction in FIG. 5), the device 100 is able to maintain a state of attaching to an object. Furthermore, the frames of the adjacent attaching means 130 may be connected to each other by a member such as a rod in order to enhance the rigidity of each frame.

In the example shown in FIG. 4A, an example in which the device 100 comprise a maintenance means 110, a transmitting and receiving means 111, a memory 112, a processor 113, a moving means 120, and an attaching means 130 was explained. However, the present invention is not limited to the above. The scope of the present invention also encompasses a system in which at least one of the components of the device 100 is located outside the body of the device 100. For example, the nacelle 14 of a wind turbine may comprise a winch 121 instead of the device 100 comprising a winch 121. In this case, the device 100 may be configured to move on the blade 11 by a rope that extends from the winch 121 of the nacelle 14 of the wind turbine being fixed to the device 100 and the winch 121 of the nacelle 14 of the wind turbine winding or delivering the rope. For example, a carrying device (e.g., a device that can fly such as a drone described below) for carrying the device 100 to a blade may comprise a winch 121 instead of the device 100 comprising a winch 121. In this case, the device 100 may be configured to move on a blade by a rope that extends from the winch 121 of the carrying device being fixed to the device 100 and the winch 121 of the carrying device winding or delivering the rope.

FIG. 5A shows a state in which a device 100 for performing maintenance on a blade of a wind turbine attaches to a thick blade, and FIG. 5B shows a state in which a device 100 for performing maintenance on a blade of a wind turbine attaches to a thin blade. FIG. 5A and FIG. 5B show a cross section near a leading edge of a blade 11 along a plane surface perpendicular to the advancing direction of the device 100.

The device 100 comprises a pair of frame assemblies as attaching means 130, and a washing means 160 or polishing means 170 as maintenance means 110.

Each frame assembly comprises a first frame 131, a second frame 132, a third frame 133, a first hinge 134, a second hinge 135, and a third hinge 136. A pair of frame assemblies are biased so that each frame is pivotably coupled therein and the pair of frame assemblies hold an object therebetween.

When attaching to a thick blade 11 as shown in FIG. 5A, each frame deforms to be widely enlarged in accordance with the blade 11 while each frame is biased inwardly in the direction of the blade 11. Thus, wheels for travelling on blade surface side 123 on both sides are pushed against the blade 11. The device 100 thereby attaches to the blade 11 in a state in which each frame deforms in accordance with the shape of the blade.

When attaching to a thin blade 11 as shown in FIG. 5B, each frame deforms to be slightly enlarged in accordance with the blade 11 while each frame is biased inwardly in the direction of the blade 11. Thus, wheels for travelling on blade surface side 123 on both sides are pushed against the blade 11. The device 100 thereby attaches to the blade 11 in a state in which each frame deforms in accordance with the shape of the blade.

The washing means 160 as maintenance means 110 may be, for example, a mechanism comprising a sponge 161, a rag 162 stuck to the surface of the sponge 161, a holding member 163 which holds the sponge 161, and a supplying device (not shown) that can supply the sponge 161 with washing liquid. The sponge 161, the rag 162, and the holding member 163 are configured to be deformable in accordance with the shape of the cross section of the blade 11. When the device 100 washes the blade 11 of a wind turbine while moving on the blade 11 of the wind turbine using such a mechanism, the holding member 163 collectively holds the sponge 161, the rag 162, and the blade 11. The rag 162 stuck to the sponge 161 is pushed against the blade 11 by the device 100 attaching to the blade 11 by the attaching means 130. The rag 162 stuck to the sponge 161 is also pushed against to the blade 11 by the gravity which acts to push the device 100 against the blade 11. The washing liquid supplied from the supplying device infiltrates into the rag 162 via the sponge 161. Washing is performed by the device 100 moving on the blade 11 while pushing the rag 162 in which the washing liquid has infiltrated against the blade 11.

The polishing means 170 as maintenance means 110 may be, for example, a mechanism comprising a sponge 171, a sand paper 172 stuck to the surface of the sponge 171, a holding member 173 which holds the sponge 171, and a motor (not shown) which can shake the holding member 173. The sponge 171, the sand paper 172, and the holding member 173 are configured to be deformable in accordance with the shape of the cross section of the blade 11. When the device 100 polishes the blade 11 of a wind turbine 10 while moving on the blade 11 of the wind turbine 10 using such a mechanism, the holding member 173 collectively holds the sponge 171, the sand paper 172, and the blade 11. The sand paper 172 stuck to the sponge 171 is pushed against the blade 11 by the device 100 attaching to the device 11 by the attaching means 130. The sand paper 172 stuck to the sponge 171 is also pushed against the blade 11 by the gravity which acts to push the device 100 against the blade 11. The motor collectively shakes the holding member 173, the sponge 171, and the sand paper 172. Polishing is performed by the device 100 moving on the blade 11 while pushing the shaking sand paper 172 against the blade 11.

In the examples shown in FIG. 5A and FIG. 5B, frame assemblies comprising three frames and three hinges were explained. However, the number of frames and hinges does not matter. The frame assemblies can comprise any number of frames and hinges. For example, the frame assemblies may comprise two frames and two hinges, or may comprise four or more frames and four or more hinges. Further, the frames were illustrated as elongated members and the hinges were illustrated as circular members in the examples shown in FIG. 5A and FIG. 5B. However, the frames and hinges are not limited to the illustrated shape. The frames and hinges can have any shape as long as the shape enables them to achieve their function.

Figure 6:
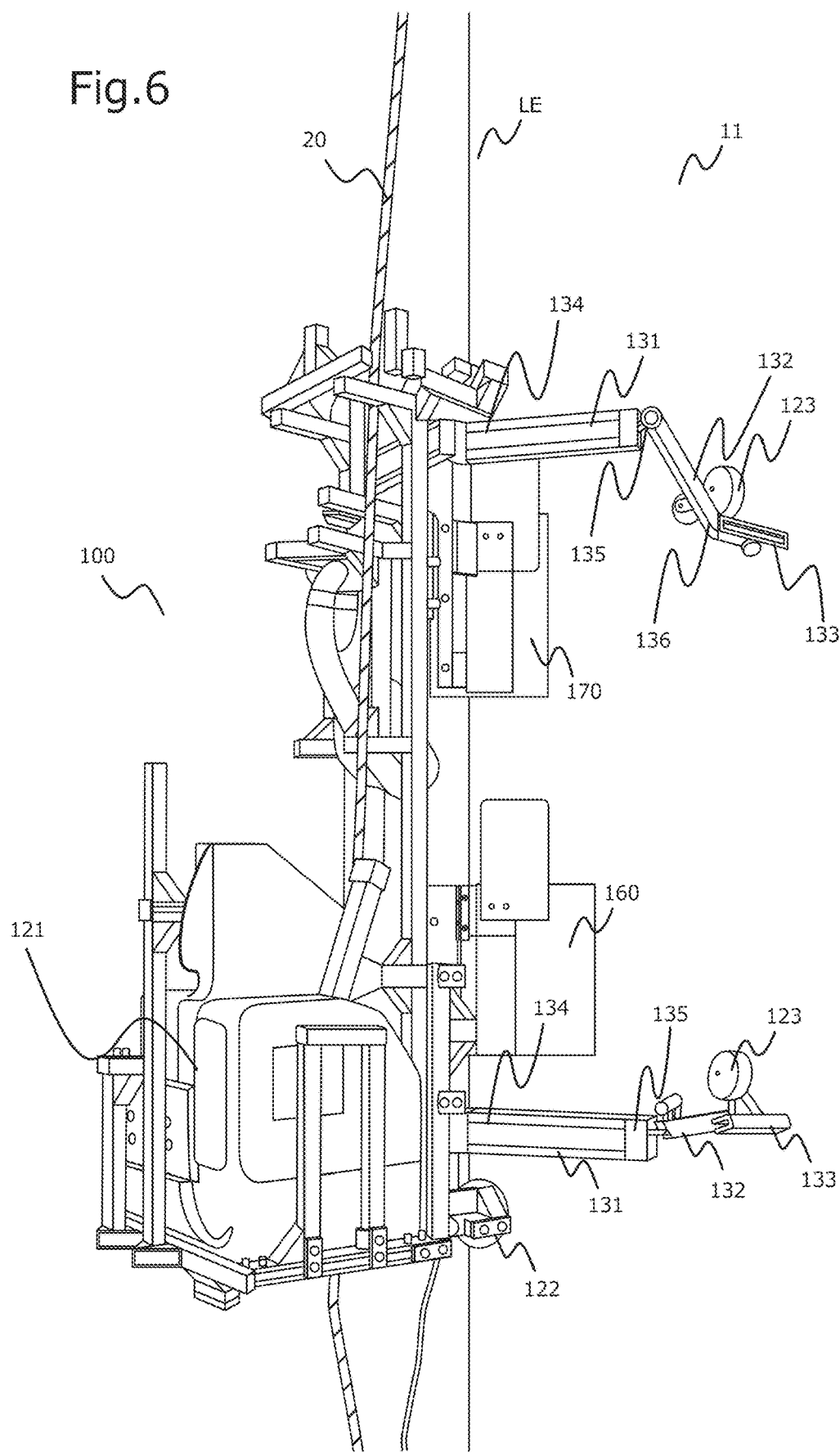
FIG. 6 A figure showing a state in which one embodiment of a device 100 for performing maintenance on a blade of a wind turbine attaches to a blade 11.

FIG. 6 shows a state in which one embodiment of a device 100 for performing maintenance on a blade of a wind turbine attaches to a blade 11.

In FIG. 6, like reference numerals are given to the same components as those shown in FIG. 4A. The explanation of the components is omitted here.

The device 100 comprises a winch 121, a wheel for travelling on leading edge 122, a wheel for travelling on blade side surface 123, a first frame 131, a second frame 132, a third frame 133, a first hinge 134, a second hinge 135, a third hinge 136, a washing means 160, and a polishing means 170.

The device 100 is able to move in the vertical direction in FIG. 6 by the winch 121, the wheel for travelling on leading edge 122, and the wheel for travelling on blade side surface 123.

The wheel for travelling on leading edge 122 is attached in a position in which the device 100, when attaching to the blade 11, is in contact with a leading edge LE. The wheel for travelling on blade side surface 123 is attached to the third frame 133 so that the device 100, when attaching to the blade 11, is in contact with the side surface of the blade.

A configuration in which the frames 131, 132, and 133 are each biased and coupled by the hinges 134, 135, and 136 enables the third frame 133 to always push the attached wheel for travelling on blade side surface 123 against the blade 11. Even when the shape of the cross section of the blade 11 changes in association with movement on the blade 11, it is possible to always push the wheel for travelling on blade side surface 123 against the blade by the frames 131, 132, and 133 pivoting and deforming in accordance with the shape of the cross section of the blade. Further, even when the shape of the cross section of the blade changes depending on the model of a wind turbine, it is possible to always push the wheel for travelling on blade side surface 123 against the blade by the frames 131, 132, and 133 pivoting and deforming in accordance with the shape of the cross section of the blade. Since the wheels for travelling on blade side surface 123 on both sides are always pushed against the blade 11, the device 100 can attach to the leading edge LE of the blade 11 without horizontally deviating.

3. Method for Performing Maintenance on a Blade of a Wind Turbine

Figure 7:
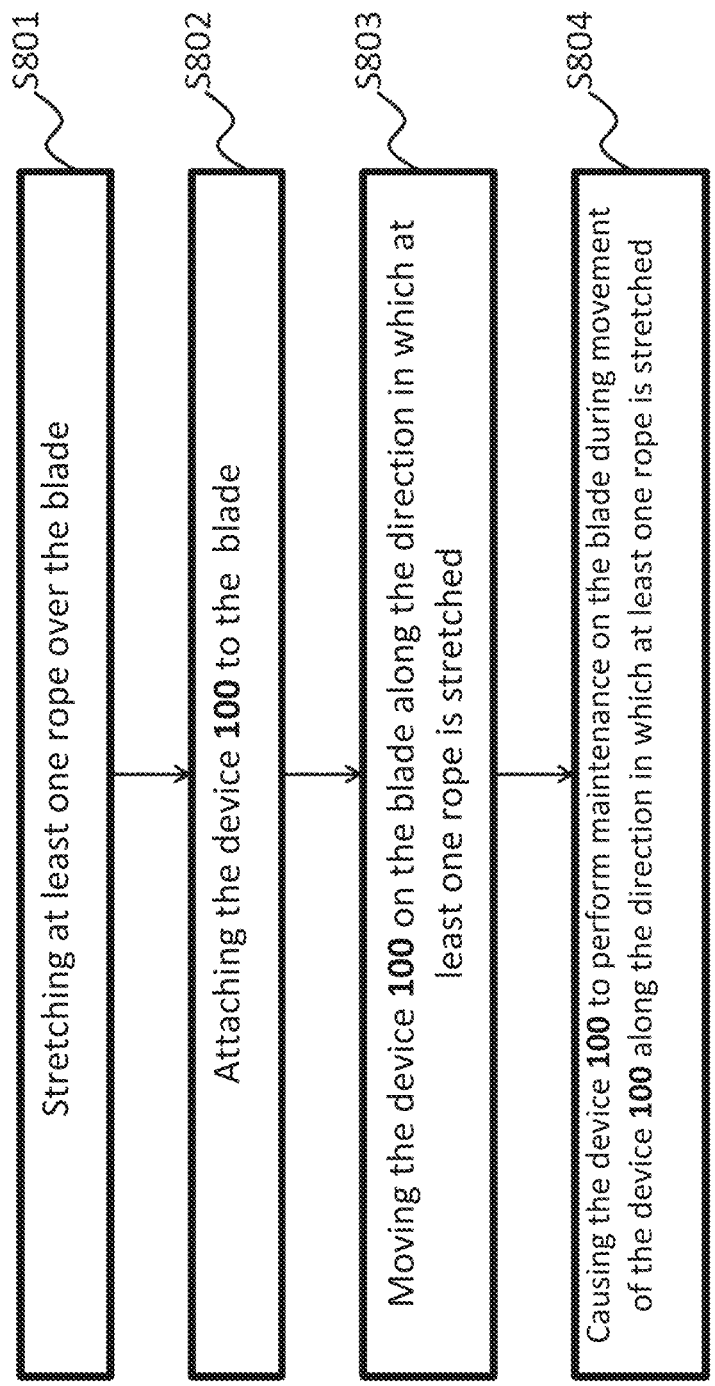
FIG. 7 A flow chart showing one example of a procedure of a method for using a device 100 for performing maintenance on a blade of a wind turbine to perform maintenance on a blade of a wind turbine.

FIG. 7 shows one example of a procedure of a method for using a device 100 for performing maintenance on a blade of a wind turbine to perform maintenance on a blade of a wind turbine.

Step S801 is step of stretching at least one rope over the blade of the wind turbine. For example, while the blade 11 is positioned so that the blade 11 extends vertically downward as shown in FIG. 1A and FIG. 1B, one rope 20 is fixed to the nacelle 14 of the wind turbine 10, extends from the nacelle 14 of the wind turbine 10 to the leading edge at the base of the blade 11 while going around the hub 15, and extends from the leading edge at the base of the blade 11 to the ground.

Step S801 may be manually performed by a worker, or may be automatically performed by a robot. When Step S801 is automatically performed by a robot, at least one rope may be stretched over the blade of the wind turbine by, for example, a device that can fly such as a drone.

Step S802 is a step of attaching the device 100 to the blade. For example, the device 100 is raised to the tip of the blade 11 along the one rope 20 stretched in Step S801, and the device 100 is attached to the leading edge at the tip of the blade 11 via the attaching means 130 as shown in FIG. 2A and FIG. 2B. Upon doing so, two ropes 21 may be connected to the device 100 and the posture of the device 100 may be controlled using the two ropes as shown in FIG. 2A and FIG. 2B. The two ropes 21 can be used, for example, to assist the device 100. The posture of the device 100 can be controlled using the two ropes 21 like a sport kite.

Step S802 may be manually performed by a worker, or may be automatically performed by a robot. When Step S802 is manually performed by a worker, Step S802 is performed by at least two workers. One worker, for example, transmits a control signal to the device 100 by a terminal for operation to cause the device 100 to wind or deliver the rope 20 and cause the device 100 to rise to the tip of the blade 11. At least one other worker, for example, uses the two ropes 21 to control the posture of the device 100. Upon doing so, an around view image of the surrounding of the device 100 may be displayed on the terminal for operation in real time, or 3D image of the blade 11 of the wind turbine may be displayed on the terminal for operation as described below. Further, the worker using the two ropes 21 to control the posture of the device 100 may wear a wearable device such as smart glasses and a head mount display and control the posture of the device 100. An around view image of the surrounding of the device 100, 3D image of the blade 11 of the wind turbine, or the like described below can be displayed on the wearable device such as smart glasses and a head mount display in real time.

When Step S802 is automatically performed by a robot, step S802 is performed by, for example, at least two robots. One robot, for example, transmits a control signal to the device 100 to cause the device 100 to wind or deliver the rope 20 and cause the device 100 to rise to the tip of the blade 11. At least one movable robot, for example, uses the two ropes 21 to control the posture of the device 100. The movable robot can control the posture of the device 100 as if navigating a sport kite by adjusting the amount and angle of winding or delivering the ropes 21 as well as tension of the ropes 21 at the other side of the ropes 21 connected to the device 100. The movable robot can comprise, for example, an encoder, and can thereby detect the amount and angle of winding or delivering the ropes 21. The movable robot can comprise, for example, a current sensor, and can thereby detect tension of the ropes 21. The movable robot can comprise, for example, a moving means such as a wheel and a continuous track, and can thereby control the posture of the device 100 while moving on the ground. Upon doing so, the movable robot may grasp its own position by using any position detecting mechanism. For example, the movable robot may grasp its own position by using a position information measuring system such as GPS, may grasp its own position by calculating moving distance from the starting point based on the number of revolutions of a wheel, may grasp its own position based on the relative position of the wind turbine with a tower, or may grasp its own position by using a combination of the foregoing.

In the examples shown in FIG. 2A and FIG. 2B, it was explained that the two ropes 21 extend to the ground and the posture of the device 100 is controlled from the ground. However, the present invention is not limited to the above. For example, the two ropes 21 may extend to a position higher than the ground and the posture of the device 100 may be controlled from a position higher than the ground. A position higher than the ground is, for example, the nacelle of the wind turbine. The two ropes 21 may extend to the nacelle and the posture of the device 100 may be controlled by using the two ropes 21 from the nacelle. This is preferable when, for example, maintenance on a wind turbine on the sea is performed. A position higher than the ground is, for example, a device that can fly such as a drone floating in the air. The two ropes 21 may extend to a device that can fly and the device that can fly may control the posture of the device 100 by using the two ropes 21 from the air. For example, the two ropes 21 may extend on or in water and the posture of the device 100 may be controlled from on or in water. For example, the two ropes 21 may extend onto a ship moving near the wind turbine, and a worker or a robot may use the two ropes 21 from the ship to control the posture of the device 100. For example, the two ropes 21 may extend to a robot that is able to move on or in water, and the robot that is able to move on or in water may use the two ropes 21 from on or in water to control the posture of the device 100. This is preferable when, for example, maintenance on a wind turbine on the sea or along the coast is performed.

Although the device 100 is raised along the rope stretched over the device 100 for attachment in the above example, the way of attaching the device 100 is not limited to the above. For example, the device 100 may be lifted to the nacelle of the wind turbine in advance and lowered to the base of the blade along the rope from the nacelle of the wind turbine, and the device 100 may be attached to the leading edge at the base of the blade. For example, the device 100 may be carried to the blade by utilizing a device that can fly such as a drone, and the device 100 may be attached to the blade. In this case, the device 100 and the device that can fly are first connected by a rope. Next, the device that can fly is caused to fly to the blade (e.g., base of the blade) and the device that can fly is attached to the blade. The way of attaching the device that can fly to the blade does not matter. For example, the device that can fly may be attached to the blade by using the same attaching means as the device 100, or may be attached by winding an expandable and contractable arm to the blade. The device 100 is attached to the blade after or concurrently with attachment of the device that can fly to the blade.

Step S803 is a step of moving the device 100 on the blade along the direction in which at least one rope is stretched after the device 100 is attached to the blade. For example, the device 100 is moved on the leading edge of the blade 11 along the direction in which the one rope 20 is stretched in Step S801 as shown in FIG. 3A and FIG. 3B. Upon doing so, the device 100 fixedly attaches to the blade 11 via the attaching means 130. This enables the device 100 to move on the leading edge of the blade 11 without floating up. Further, since the leading edge of the blade 11 is inclined by about 5 degrees relative to the vertical direction, the gravity acting on the device 100 acts so as to push the device 100 against the leading edge of the blade 11 and prevents the device 100 from floating up. For example, Step S803 may be performed in response to transmission of a control signal to the device 100 by a worker using a terminal for operation, or may be performed in response to transmission of a control signal to the device 100 by a robot.

The step of moving the device 100 in Step S803 may comprise moving the device 100 on the blade in a first direction along the direction in which at least one rope is stretched, and moving the device 100 on the blade in a second direction along the direction in which at least one rope is stretched. For example, the first direction is a direction from the tip of the blade toward the root of the blade, and the second direction is a direction from the root of the blade toward the tip of the blade. The device 100 can move in the first direction or the second direction by controlling the winding or delivering by a winch 121.

Step S804 is a step of causing the device 100 to perform maintenance on the blade during movement of the device 100 along the direction in which at least one rope is stretched. For example, the device 100 is caused to perform maintenance on the blade 11 during movement of the device 100 on the leading edge of the blade 11 as shown in FIG. 3A and FIG. 3B. Upon doing so, the device 100 is fixedly attached to the blade 11 via the attaching means 130. This enables the device 100 to push a maintenance means such as a washing means 160 and polishing means 170 against the leading edge of the blade 11 without floating up. Further, since the leading edge of the blade 11 is inclined by about 5 degrees relative to the vertical direction, the gravity acting on the device 100 acts so as to push the device 100 against the leading edge of the blade 11 and prevents the device 100 from floating up. For example, Step S804 may be performed in response to transmission of a control signal to the device 100 by a worker using a terminal for operation, or may be performed in response to transmission of a control signal to the device 100 by a robot.

As described above, each step of the method for performing maintenance on a blade of a wind turbine may be initiatively performed by a worker, or may be automatically performed by a robot. When each step is performed by a robot, a worker does not need to be in a work site, which enables maintenance on an object to be safely performed.

As used herein, "during movement" refers to a period of moving from one position to another position. It is not necessarily required to keep moving. For example, a period during which a device 100 moves from the tip of a blade to the base of the blade while repeating advancing and stopping is also encompassed in "during movement".

Figure 8:
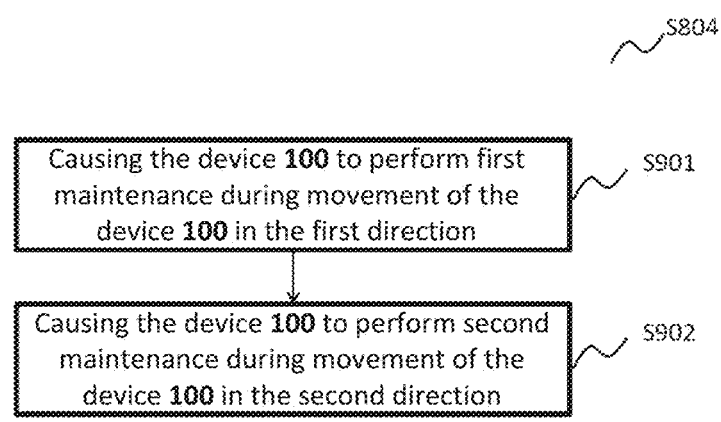
FIG. 8 A flow chart showing one example of a procedure of actions performed in Step S804 when Step S803 comprises moving a device 100 in a first direction and moving the device 100 in a second direction.

FIG. 8 shows one example of a procedure of actions performed in Step S804 when Step S803 comprises moving the device 100 in the first direction and moving the device 100 in the second direction.

In Step S901, the device 100 is caused to perform first maintenance during movement of the device 100 in the first direction along the direction in which at least one rope is stretched. For example, the device 100 is caused to image the surface of the blade by using an imaging means 140 during movement of the device 100 in the direction from the tip of the blade toward the base of the blade.

In Step S902, the device 100 is caused to perform second maintenance different from the first maintenance during movement of the device 100 on the blade in the second direction different from the first direction. For example, the device 100 is caused to wash the surface of the blade by using a washing means 160 during movement of the device 100 in the direction from the base of the blade toward the tip of the blade after the device 100 reaches the base of the blade while performing the first maintenance in Step S901.

The timing for switching Step S901 and Step S902 does not matter. For example, the step may be switched to Step S902 to cause the device 100 to move in the second direction and perform the second maintenance after the device 100 reaches the end of the first direction (base of the blade in the above-described example) in Step S901, or the step may be switched to Step S902 to cause the device 100 to move in the second direction and perform the second maintenance before the device 100 reaches the end of the first direction in Step S901.

A plurality of additional steps may follow Step S902. For example, the device 100 may be caused to perform third maintenance different from the first maintenance or second maintenance during movement of the device 100 on the blade in the first direction in Step S903. For example, the device 100 may be caused to perform fourth maintenance different from the first to third maintenance during movement of the device 100 on the blade in the second direction in Step S904 after Step S903. This procedure enables the device 100 to change the working content of maintenance for each movement on the blade.

Figure 9A:
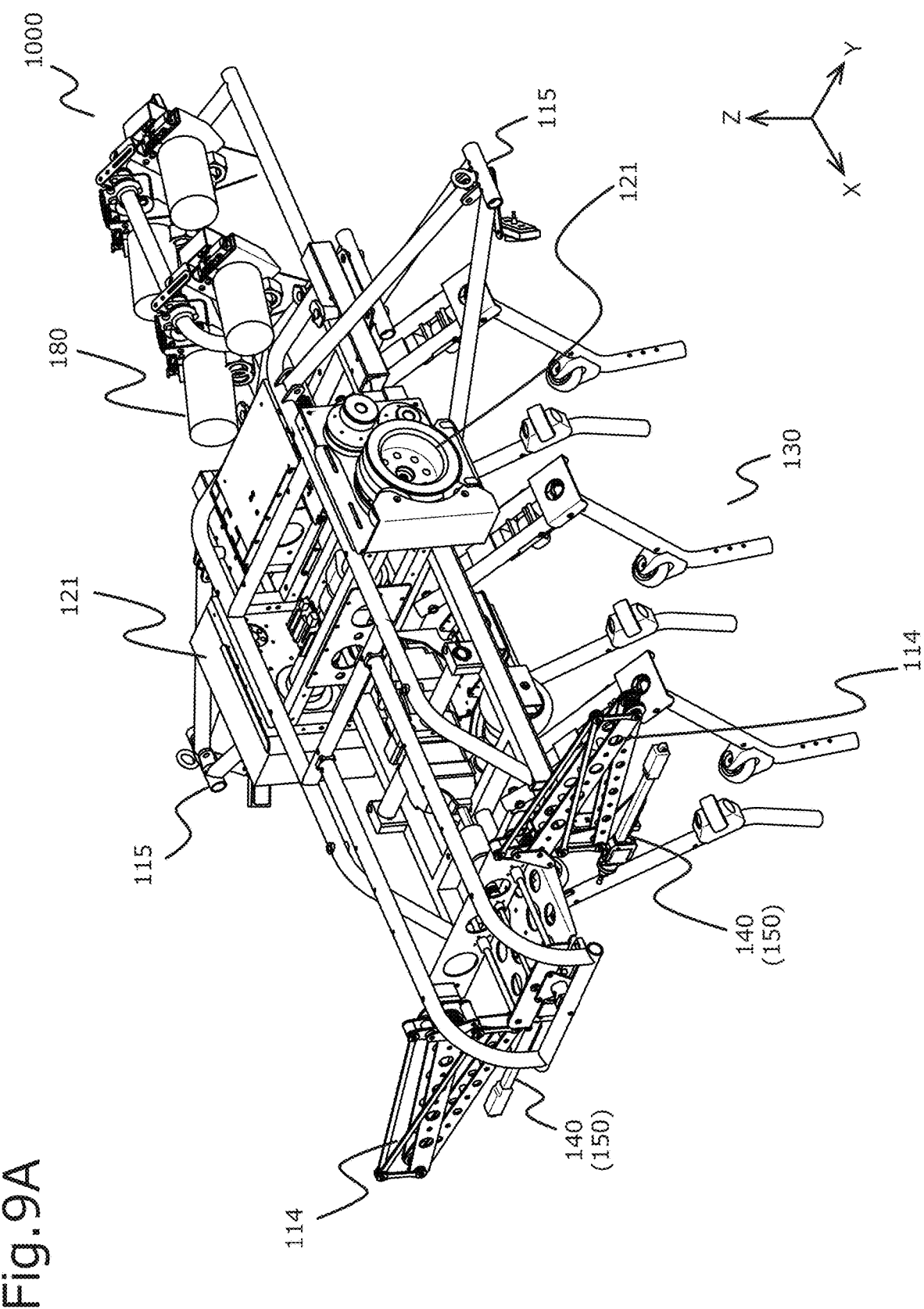
FIG. 9A A top side perspective view of a device 1000.
Figure 9C:
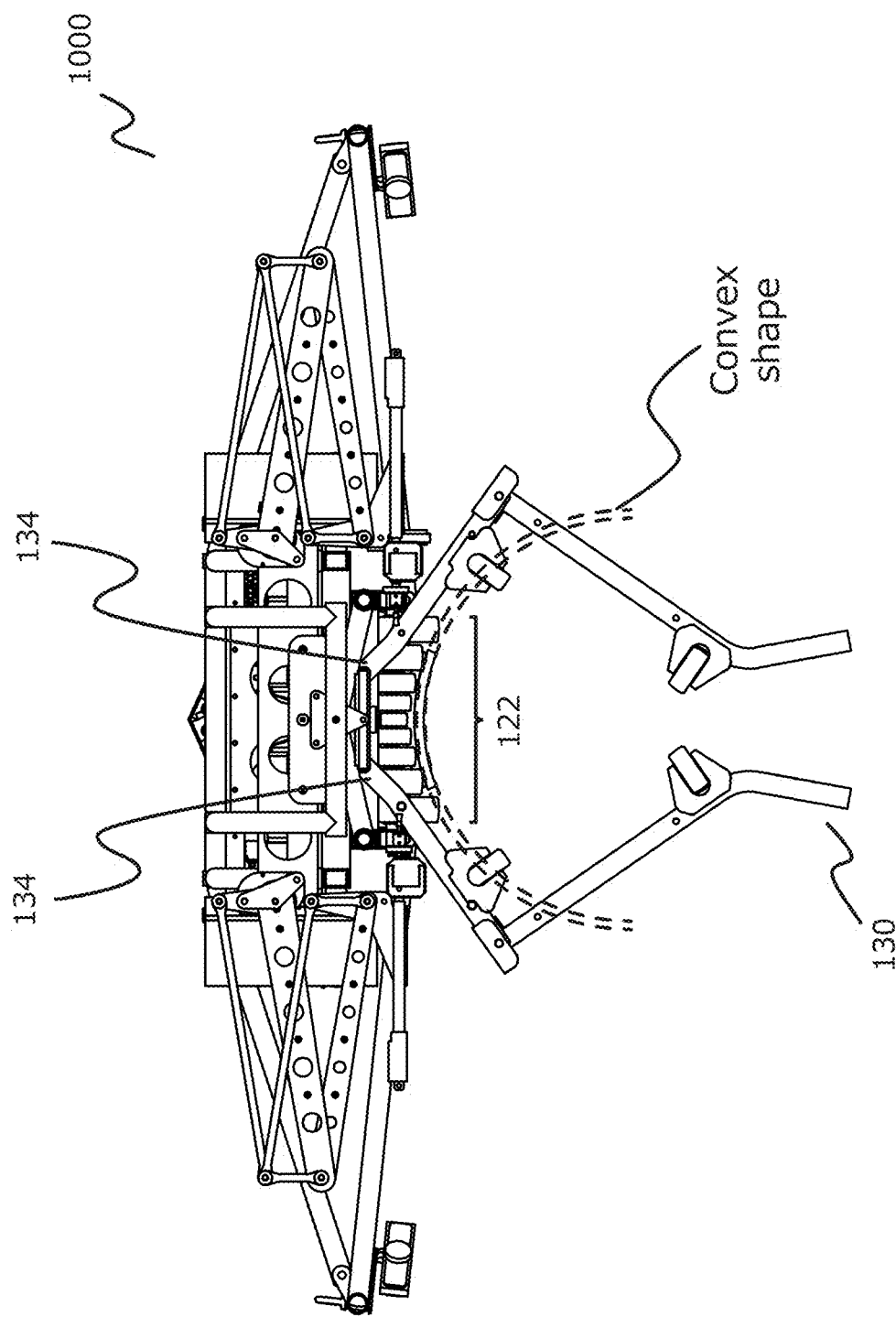
FIG. 9C A front view of a device 1000.

4. Alternative Embodiment of a Device for Performing Maintenance on a Blade of a Wind Turbine FIG. 9A, FIG. 9B, and FIG. 9C show one example of the appearance of a device 1000, which is an alternative example of a device 100 for performing maintenance on a blade of a wind turbine. FIG. 9A is a top side perspective view of the device 1000, FIG. 9B is a bottom side perspective view of the device 1000, and FIG. 9C is a front view of the device 1000. For explanation below, the longitudinal direction of the device 1000 is deemed as an x-axis, the transverse direction of the device 1000 is deemed as a y-axis, and the direction perpendicular to the x-axis and y-axis is deemed as a z-axis in FIG. 9A.

In FIG. 9A, FIG. 9B, and FIG. 9C, like reference numerals are given to the same components as those shown in FIG. 4A. The explanation of the components is omitted here. It should be noted that although the device 1000 has a different configuration from that of the device 100, maintenance on a blade of a wind turbine can be performed in the same method as the method described above with reference to FIG. 7 and FIG. 8.

The device 1000 can comprise two winches 121 on both sides of the device 1000. The example shown in FIG. 9A and FIG. 9B shows the two winches 121 in a state in which one winch is encased in a housing and the other winch is not encased in the housing. Although the presence or absence of a housing of a winch does not matter in the present invention, it is preferable to have a housing. The reason is as follows: when there is space around a rope wound around a winch, the rope may be loosened, which causes a defect such as entanglement of the rope; thus, generation of looseness of the rope can be suppressed by filling the space around the rope using a housing. It is preferable that the housing has a shape to fill the space around the winch. It is further preferable that the housing has a shape to push the rope against the winch.

The two winches 121 are each connected to two ropes 20 stretched over a blade of a wind turbine and can support the device 1000 from both sides. This makes the posture of the device 1000 more stable.

The two winches 121 have a first mode in which the winches are independently controlled and a second mode in which the winches are controlled in synchronization. When the two winches 121 are each connected to the two ropes 20, the two winches 121 are actuated in the first mode in which the winches are independently controlled. For example, when the two winches 121 are each connected to the two ropes 20, the posture may be inclined due to deviation generated in the winding of the ropes between the two winches 121. In this case, it is possible to eliminate the deviation in the winding of the ropes and maintain a stable posture by independently controlling only one winch 121. After the two winches 121 are each connected to the two ropes 20, the two winches 121 are controlled in the second mode in which the winches are controlled in synchronization. This makes it possible to equally wind or deliver the ropes by the two winches 121 and to maintain a stable posture. For example, the device 1000 can move on the blade while maintaining a stable posture by being actuated in the second mode when moving the device 1000 on the blade.

Figure 10A:
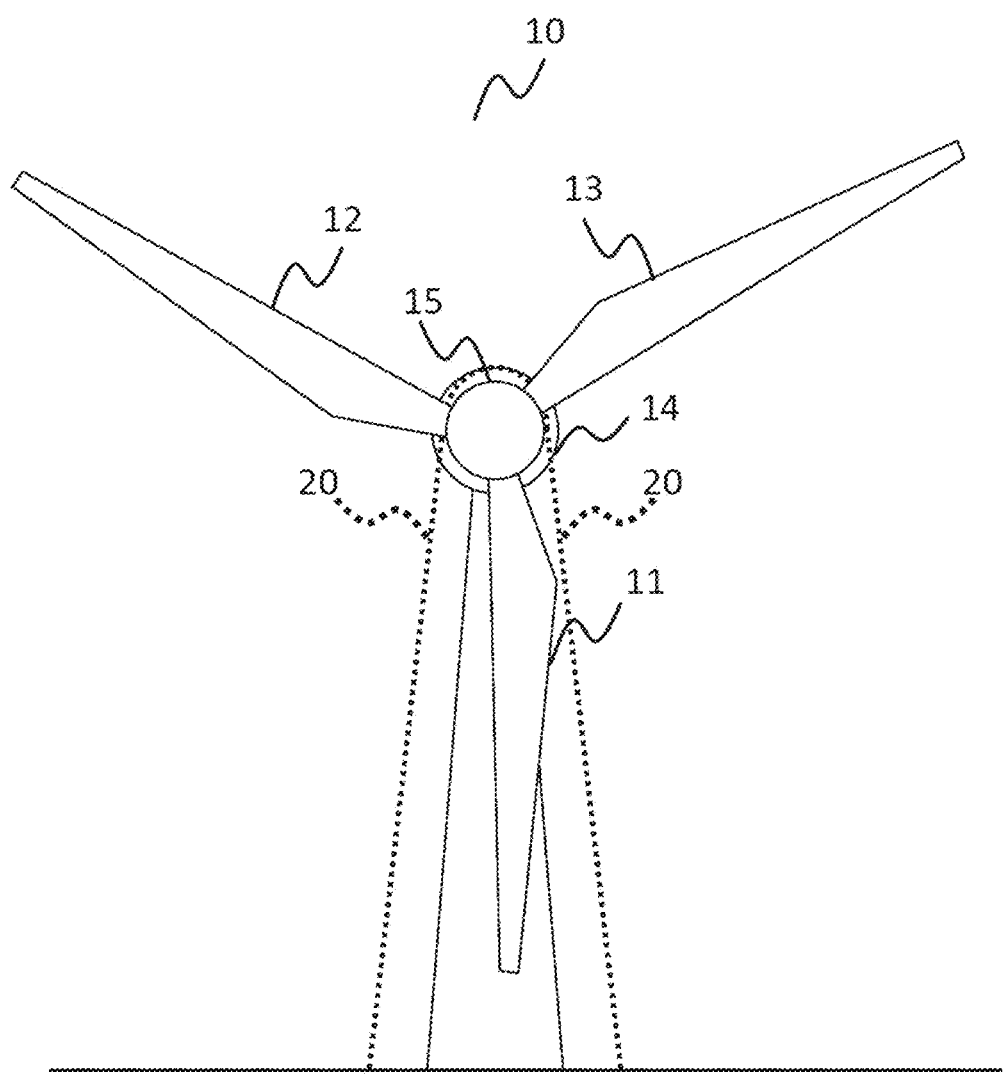
FIG. 10A A figure showing the state of a preparation stage before attaching a device 1000 to a blade 11 of a wind turbine 10.
Figure 10B:
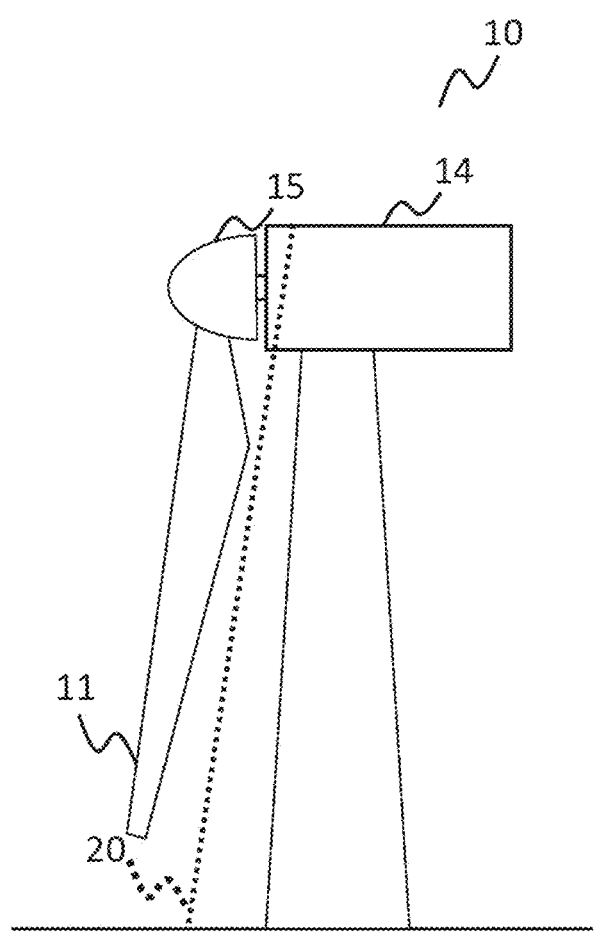
FIG. 10B A figure showing the state of a preparation stage before attaching a device 1000 to a blade 11 of a wind turbine 10.
Figure 11A:
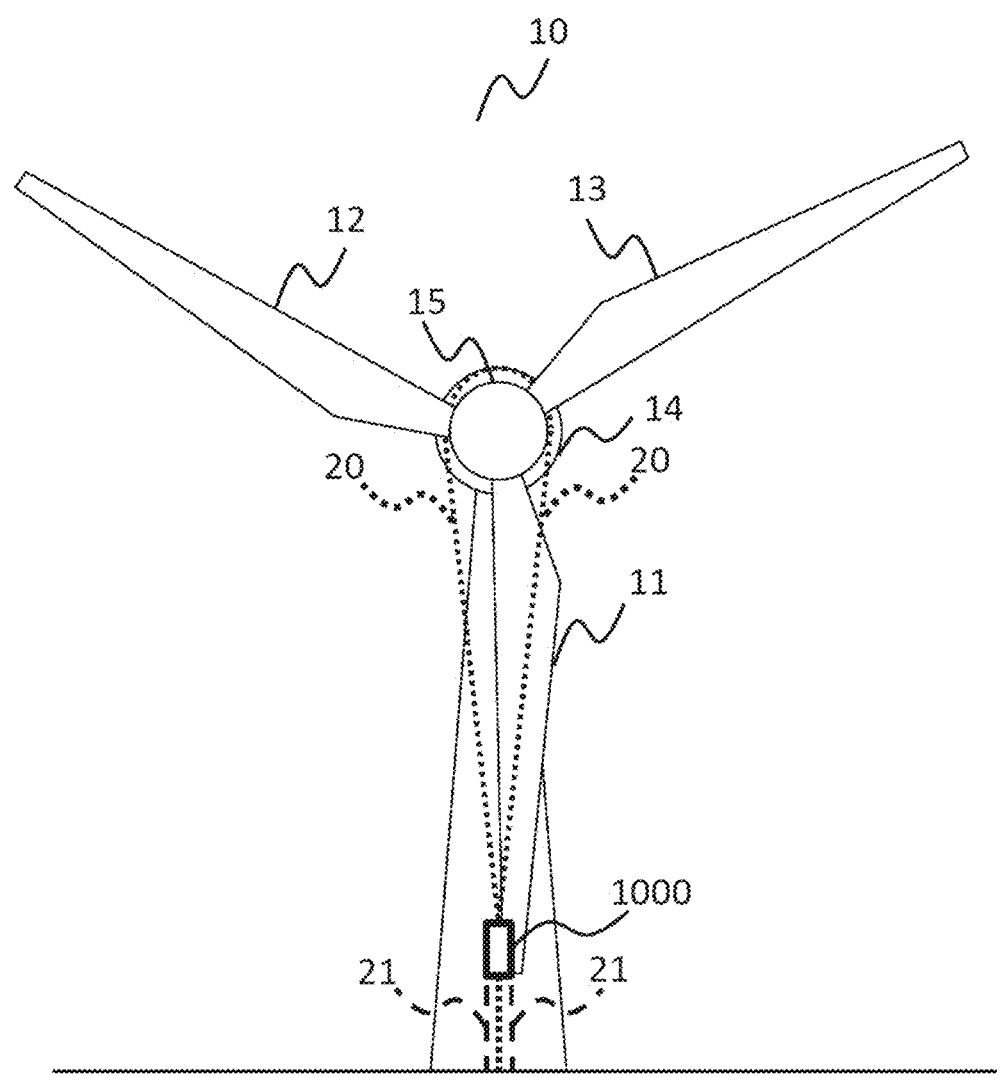
FIG. 11A A figure showing the state of a stage for attaching a device 1000 to a blade 11 of a wind turbine 10.
Figure 11B:
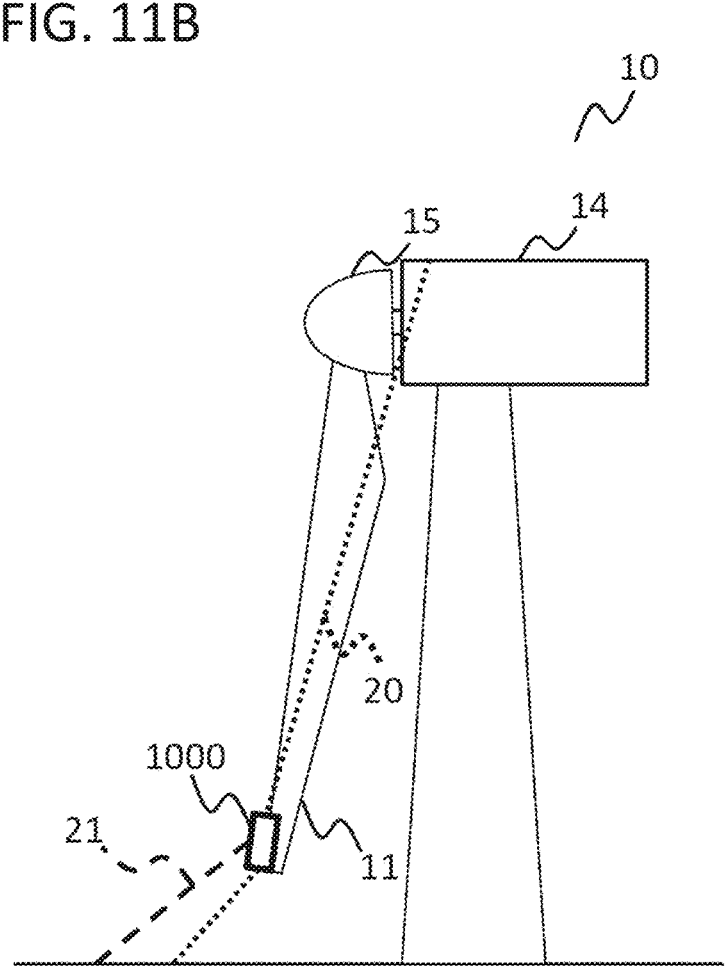
FIG. 11B A figure showing the state of a stage for attaching a device 1000 to a blade 11 of a wind turbine 10.
Figure 12A:
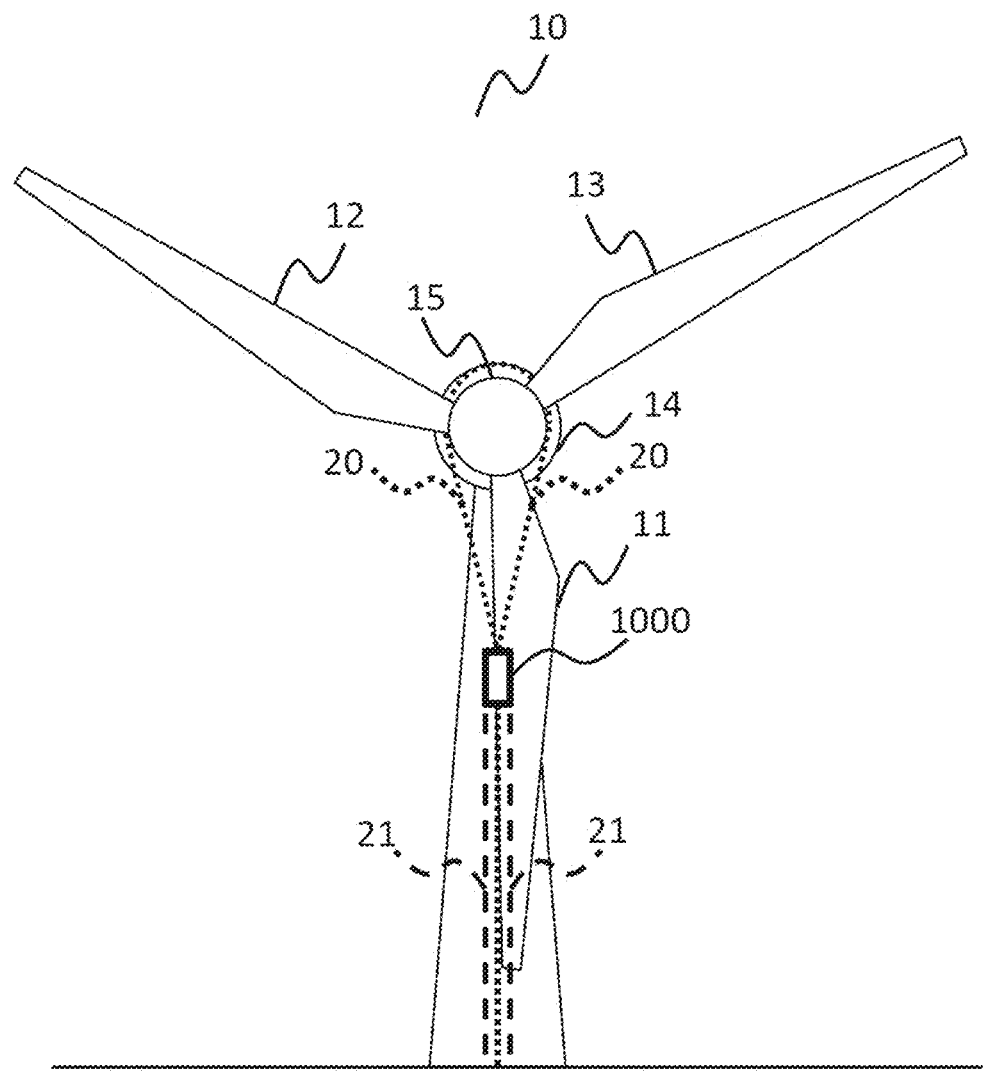
FIG. 12A A figure showing a state in which a device 1000 moves on a leading edge of a blade 11 along a rope 20.
Figure 12B:
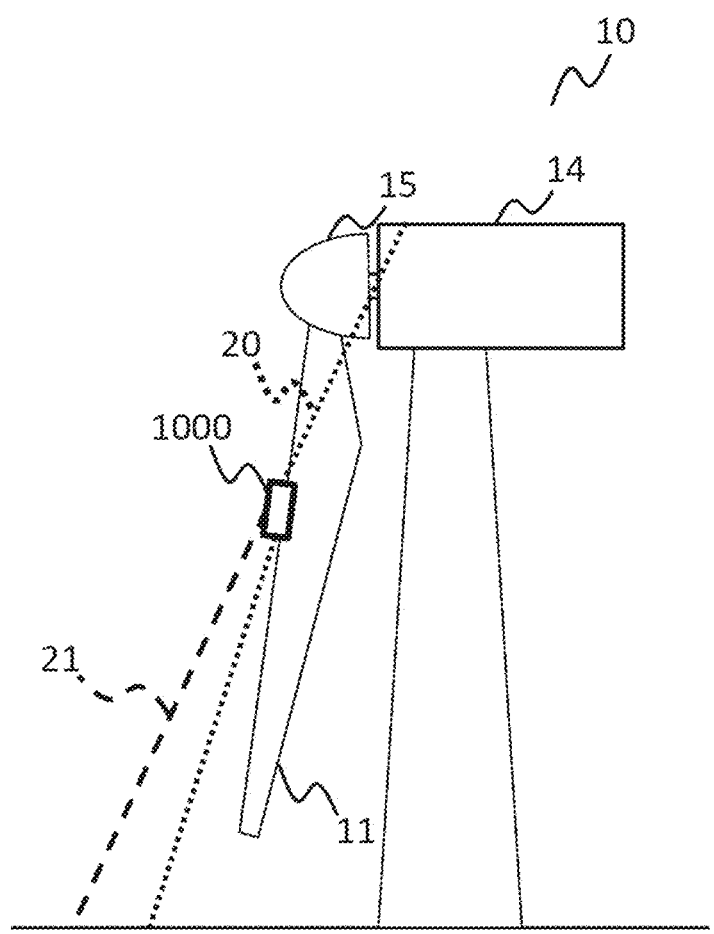
FIG. 12B A figure showing a state in which a device 1000 moves on a leading edge of a blade 11 along a rope 20.

FIG. 10 to FIG. 12 are figures showing a state in which a device 1000 comprising two winches 121 performs maintenance on a blade 11 of a wind turbine 10. FIG. 10A and FIG. 10B show the state of a preparation stage before attaching the device 1000 to the blade 11 of the wind turbine 10, FIG. 11A and FIG. 11B show the state of a stage for attaching the device 1000 to the blade 11 of the wind turbine 10, and FIG. 12A and FIG. 12B show a state in which the device 1000 moves on the leading edge of the blade 11 along ropes 20. FIG. 10 to FIG. 12 explain the same examples as those in FIG. 1 to FIG. 3 except for the point that the device 1000 comprises two winches 121.

As shown in FIG. 10 to FIG. 12, the two ropes 20 used by the two winches 121 do not need to extend from a nacelle 14 of the wind turbine 10 to the leading edge at the base of the blade 11 while going around a hub 15, different from the case of using one rope 20 as shown in FIG. 1 to FIG. 3. The two ropes 20 used by the two winches 121 are able to directly extend from the nacelle 14 of the wind turbine 10 to the ground without going around the hub 15. That is because the two ropes 20 do not need to be stretched over the leading edge of the blade. Since such rope arrangement is the same as the rope arrangement in a conventional method in which a worker moves on a blade along a rope stretched over the blade to perform maintenance, there is an advantage that existing ropes in a work site can be utilized as they are without requiring special rope arrangement for using the device 1000. Furthermore, since such rope arrangement does not interfere with the hub 15 of the wind turbine, it is possible to rotate the blade 11 of the wind turbine 10 while keeping the ropes 20 attached to the nacelle 14 in the same manner as a conventional method in which a worker moves on a blade along a rope stretched over the blade to perform maintenance. As a result, it is not necessary to stretch a rope for each blade when performing maintenance on a plurality of blades of a wind turbine, and thus maintenance can be efficiently performed.

The device 1000 may comprise a posture controlling device. The posture controlling device can be a device that is able to generate a moment around any axis in order to control the posture of the device 1000. The posture controlling device may be used concomitantly with adjusting the tension of two ropes 21 by a worker from the ground to control the posture of the device 1000, or may be used without adjusting the tension of the two ropes 21 by the worker from the ground to control the posture of the device 1000. This makes it possible to assist adjusting the tension of the two ropes 21 by the worker from the ground to control the posture of the device 1000, or to eliminate need for adjusting the tension of the two ropes 21 by the worker from the ground to control the posture of the device 1000.

For example, the posture controlling device can be propellers attached to both sides of the device 1000. The propellers can be attached to, for example, a frame 115 extending to both sides of the device 1000. The propellers can adjust generated propulsive force by control of the rotational speed. The propellers also can make the direction for generating propulsive force variable by being configured to have a changeable attachment angle to the device 1000. For example, when the attachment angle is changed so that the propellers generate propulsive force in the z-axis direction, a moment around the x-axis is generated in the device 1000 by controlling the propellers on both sides to have a different rotational speed. This makes it possible to control the posture around the x-axis. For example, when the attachment angle is changed so that the propellers generate propulsive force in the x-axis direction, a moment around the z-axis is generated in the device 1000 by controlling the propellers on both sides to have a different rotational speed. This makes it possible to control the posture around the z-axis. It should be noted that the propellers can be attached to not only left and right both sides but also upper and lower both sides or front and rear both sides in order to generate a moment around a desired axis.

For example, the posture controlling device can be a device that can fly such as a drone attached to the both sides of the device 1000. The device that can fly can be attached, for example, to the frame 115 extending to both sides of the device 1000. It should be noted that the device that can fly can be attached to not only left and right both sides but also upper and lower both sides or front and rear both sides in order to generate a moment around a desired axis.

It is possible to readily control the posture of the device 1000 by using such a posture controlling device concomitantly with operation of the two ropes 21 by a worker even when it is difficult to control the posture due to, for example, a strong wind.

As shown in FIG. 9C, the frame in attaching means 130 is attached to the body of the device 1000 via first hinges 134 in the device 1000. Further, the device 1000 comprises wide wheels for travelling on leading edge 122. The wheels for travelling on leading edge 122 are configured to have an outer wheel with a larger diameter than that of an inner wheel. In this case, the frame in attaching means 130 and the wheels for travelling on leading edge 122 form a convex shape in the front view by narrowing the gap between the first right and left hinges 134 and widening the width of the wheels for travelling on leading edge 122. For example, the convex shape is indicated as a double broken line in FIG. 9C. The frame in attaching means 130 and the wheels for travelling on leading edge 122 forming a convex shape in the front view is helpful for properly positioning a blade of a wind turbine in central position of the device 1000 when attaching the device 1000 to the blade. Specifically, the blade is guided by the frame in attaching means 130 and the wheels for travelling on leading edge 122 and positioned in the central position of the device 1000 to be stable even if the blade is deviated from the central position of the device 1000 when the device 1000 is attached to the blade of the wind turbine. It is preferable that there is no gap in the front view between the frame in attaching means 130 and the wheels for travelling on leading edge 122. That is because, when there is a gap in the front view between the frame in attaching means 130 and the wheels for travelling on leading edge 122, the blade may fit in the gap when the blade is guided to the central position.

The device 1000 may comprise two manipulators 114. The two manipulators 114 are configured to be foldable. At least one of maintenance means can be provided to the tip of the two manipulators 114. For example, an imaging means 140 is provided to the tip of the two manipulators 114. The device 1000 is able to image a place away from the device 1000 by extending the manipulators 114 to which the imaging means 140 is attached. The device 1000 can, for example, image the surface near the trailing edge (rear edge) of a blade of a wind turbine while being attached to the leading edge of the blade. For example, a conduction examining means 150 is provided to the tip of the two manipulators 114. The device 1000 is able to examine a lightning receiving portion located away from the device 1000 by extending the manipulators 114 to which the conduction examining means 150 is attached. For example, an applying means 180 is provided to the tip of the two manipulators 114. The device 1000 is able to apply a material to a place away from the device 1000 by extending the manipulators 114 to which the applying means 180 is attached. Furthermore, the number and attachment position of the manipulators 114 do not matter. Any number of manipulators 114 can be attached to any place of the device 1000.

At least one of maintenance means may be detachably attached to the tip of the manipulators 114. This enables the manipulators 114 to perform a plurality of maintenances. For example, in a first step, the surface of a blade of a wind turbine is observed by attaching an imaging means 140 to the tip of the manipulators 114 and making movement on the blade of the wind turbine. In a second step, a part requiring repair discovered in the first step is polished by exchanging the imaging means 140 at the tip of the manipulators 114 with a polishing means 170 and making movement on the blade of the wind turbine. In a third step, putty is applied to the part requiring repair polished in the second step by exchanging the polishing means 170 at the tip of the manipulators 114 with an applying means 180 and making movement on the blade of the wind turbine. In a fourth step, the part requiring repair to which putty was applied in the third step is polished to be smooth by exchanging the applying means 180 at the tip of the manipulators 114 with the polishing means 170 and making movement on the blade of the wind turbine. In a fifth step, the part requiring repair polished to be smooth in the fourth step is washed by exchanging the polishing means 170 at the tip of the manipulators 114 with a washing means 160 and making movement on the blade of the wind turbine. In a sixth step, the part requiring repair washed in the fifth step is painted by exchanging the washing step 160 at the tip of the manipulators 114 with the applying means 180 and making movement on the blade of the wind turbine. The part requiring repair may be repaired by these steps.

The manipulators 114 may comprise a mechanism (e.g., robot hand) (not shown) which operates while imitating the actions of an operator's arms, hands, fingers or the like. This enables the device 1000 to perform maintenance by using the manipulators 114 that operate according to the operator's actions. Upon doing so, the manipulators 114 may comprise a sensor detecting the state of the surface of an object to be in contact (e.g., a sensor detecting the elasticity of the surface, a sensor detecting the roughness on the surface, or the like) and thereby deliver the detected state of the surface of the object to the operator as tactile feedback. This enables the operator to operate the manipulators 114 with a sense as if he/she actually touches the surface of the object. For example, when putty is applied to the surface of a leading edge of a blade, a skilled sense is required in order to apply a proper amount of putty in a proper thickness. The operator can apply putty to the surface of the leading edge of the blade while utilizing his/her skilled sense by operating the manipulators 114 based on the provided tactile feedback. For example, the manipulators 114 may be configured to perform an action of holding an object. This enables performing an action of holding an object by using the manipulators 114 and sticking the held object to a blade of a wind turbine. This enables the manipulators 114 to stick, for example, a device such as a vortex generator that modifies an aerodynamic characteristic to the blade of the wind turbine.

The tip of the manipulators 114 can be controlled to be always perpendicular to the surface of a blade. This is useful when, for example, the conduction examining means 150 is provided to the tip of the manipulators 114. The lightning receiving portion on a blade of a wind turbine is formed as a recessed portion having a wall surface perpendicular to the surface of the blade of the wind turbine. It is necessary to insert a probe straight in the recessed portion when examining the conduction of the light receiving portion. That is because the probe cannot be properly inserted in the recessed portion when the probe is inclined. Thus, it is preferable to control the probe for examining conduction at the tip of the manipulators 114 to be always perpendicular to the surface of the blade.

Controlling the tip of the manipulators 114 to be always perpendicular to the surface of the blade can be achieved by, for example, using a technique for controlling a relative posture. The technique for controlling a relative posture is, for example, a technique using at least two separated lasers provided to the tip of the manipulators 114. This is to calculate the inclination of the probe by detecting a path difference between the at least two separated lasers. For example, the path difference between the at least two separated lasers is zero when the tip of the manipulators 114 is perpendicular to the surface of the blade, whereas the path difference between the at least two separated lasers is non-zero when the tip of the manipulators 114 is inclined relative to the surface of the blade. This is utilized to control the inclination of the tip of the manipulators 114 so that the path difference between the at least two separated lasers is zero.

Figure 13:
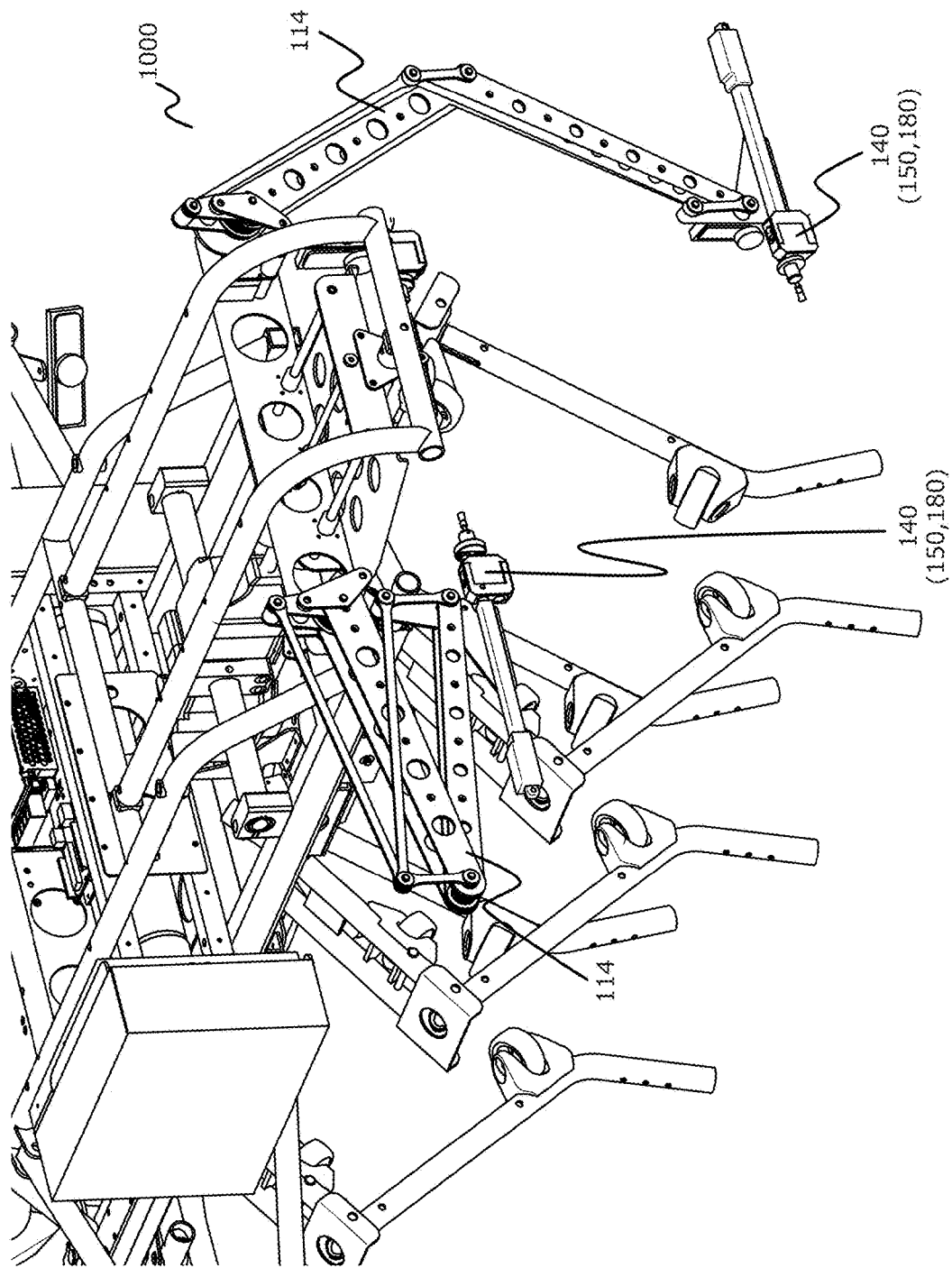
FIG. 13 A figure showing the state of two manipulators 114 before and after folding.

FIG. 13 shows the state of two manipulators 114 before and after folding. In FIG. 13, the manipulator 114 on the left side is shown in the folded state, while the manipulator 114 on the right side is shown in the extended state. The two manipulators 114 can transition between the folded state and the extended state in accordance with the situation. For example, the manipulators 114 are maintained in the folded state when a device 1000 does not perform maintenance using the manipulators 114. This enables avoiding collision of the manipulators 114 with a blade of a wind turbine when the device 1000 is attached to the blade. It is also possible to avoid collision of the manipulators 114 with the blade even when the blade becomes thicker as the device 1000 moves on the blade.

The device 1000 may comprise a plurality of imaging means 140 in a plurality of positions on the device 1000. The device 1000 can comprise, for example, seven imaging means 140. The positions of the seven imaging means 140 may be, for example, (1) the tip of the manipulator 114 on the right side, (2) the tip of the manipulator 114 on the left side, (3) the intermediate position between the manipulators 114 on the right and left sides, (4) the outermost portion of a frame 115 on the right side, (5) the outermost portion of a frame 115 on the left side, (6) the intermediate position between the frames 115 on the right and left sides, or (7) the most rear portion of the device 1000. The device 1000 can create an around view image from outputs of the plurality of imaging means 140 in the plurality of positions. The around view image is an image by which a wide area (e.g., 180°, 270°, 360°, or the like) around the device 1000 can be visually recognized. The around view image can be created by, for example, applying a known image synthesis technique to the outputs of the plurality of imaging means 140 in the plurality of positions. Displaying the created around view image to an interface for operation of a terminal for operation of an operator enables the operator to intuitively operate the device 1000 by, which leads to improvement of the operability of the device 1000 by operation.

The interface for operation displayed to the terminal for operation of the operator may display current position information and/or dimension information (e.g., a ruler) of the device 1000 on the blade in addition to or instead of the around view image. This enables detecting and recording the position and/or size of damage on the blade. For example, the current position information of the device 1000 on the blade may be displayed as a distance from the tip of the blade. This is achieved by, for example, calculating the distance of the movement of the device 1000 on the blade from the number of revolutions of a wheel for travelling on leading edge 122 and/or a wheel for travelling on blade side surface 123. For example, the dimension information can be obtained by imaging an object with a known size on the blade and calculating the relative size based on the known size and the magnification of the image.

It is possible to create a damage map of the blade by detecting and recording the position and/or size of damage on the blade. The operator can move the device 1000 to a position with the damage based on the created damage map and perform maintenance in accordance with the damage. For example, it is possible to create a damage map by utilizing the image imaged during movement of the device 1000 in the direction from the tip of the blade toward the base of the blade in the above-described Step S901. Subsequently, it is possible to cause the device 1000 to perform maintenance such as washing, polishing, and applying based on the created damage map during movement of the device 1000 in the direction from the base of the blade toward the tip of the blade in Step S902.

The interface for operation displayed to the terminal for operation of the operator may display 3D image of the blade of the wind turbine in addition to or instead of the above-described image and/or information. The 3D image can be constructed, for example, based on outputs or the like of the plurality of imaging means 140. The 3D image can be displayed, for example, to the terminal for operation such as a head mount display. The operator can freely observe the blade of the wind turbine via the 3D image by operation such as scaling or changing the viewpoint of the 3D image of the blade of the wind turbine. The 3D image of the blade of the wind turbine and the manipulators 114 comprising a mechanism that operates while imitating the operator's actions enable the operator to operate the device 1000 on the ground as if he/she is working on the blade of the wind turbine.

Figure 14:
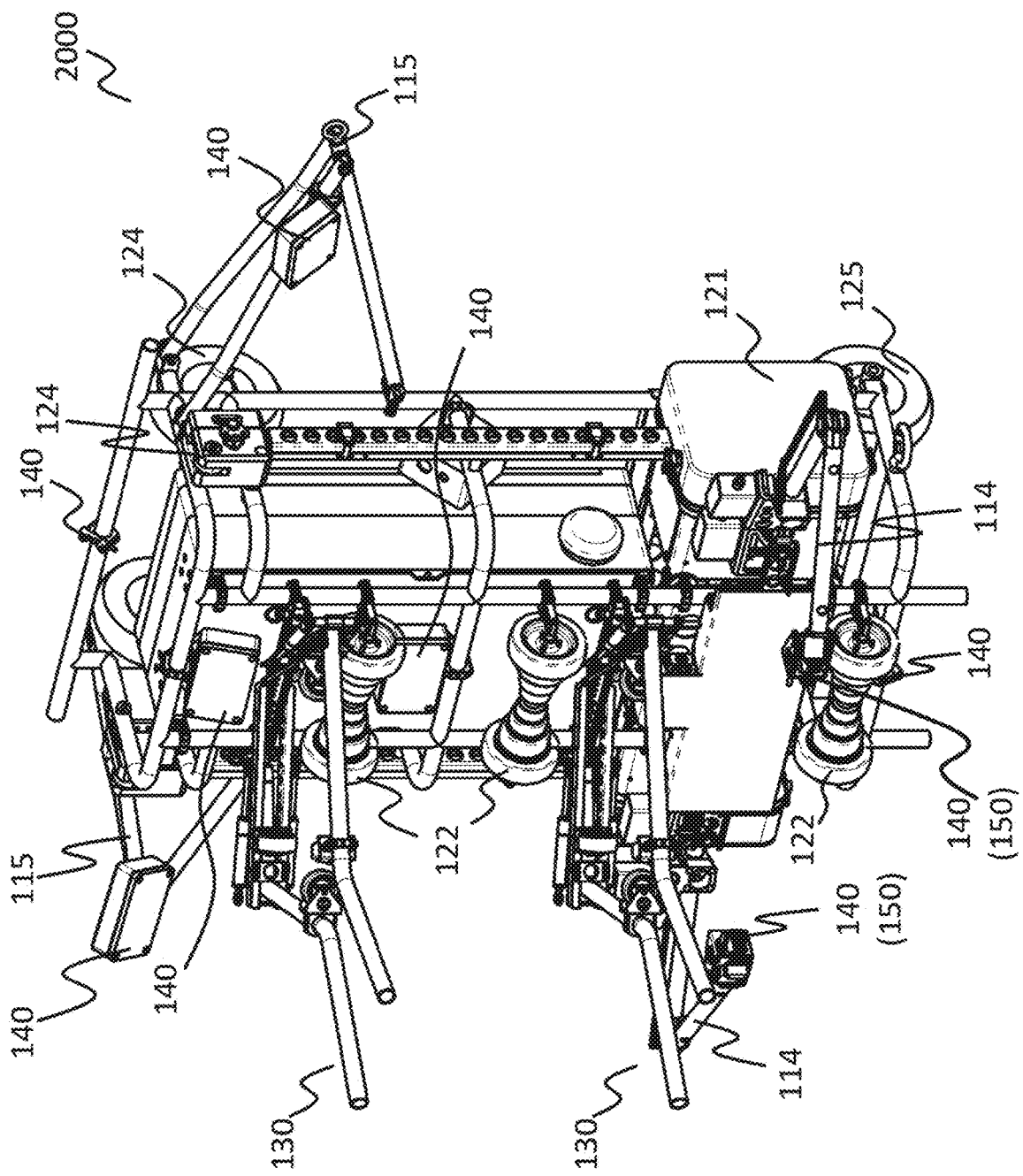
FIG. 14 A figure showing one example of the appearance of a device 2000, which is an alternative embodiment of a device 100 for performing maintenance on a blade of a wind turbine.

FIG. 14 shows one example of the appearance of a device 2000, which is an alternative embodiment of a device 100 for performing maintenance on a blade of a wind turbine. FIG. 14 is a bottom side perspective view of the device 2000.

In FIG. 14, like reference numerals are given to the same components as those shown in FIG. 4A and FIG. 9A to FIG. 9C. The explanation of the components is omitted here. It should be noted that although the device 2000 has a different configuration from that of the device 100 or 1000, maintenance on a blade of a wind turbine can be performed in the same manner as the method described above with reference to FIG. 7 and FIG. 8.

The device 2000 can comprise a rope guide 124 for guiding a rope delivered from a winch 121. This enables the rope delivered from the winch 121 to extend without interfering with the device 2000. It is preferable to provided a bearing to the tip of the rope guide 124. The largest frictional resistance to the rope is generated at the tip of the rope guide 124. It is possible to decrease the frictional resistance to be generated by providing a bearing.

Figure 15:
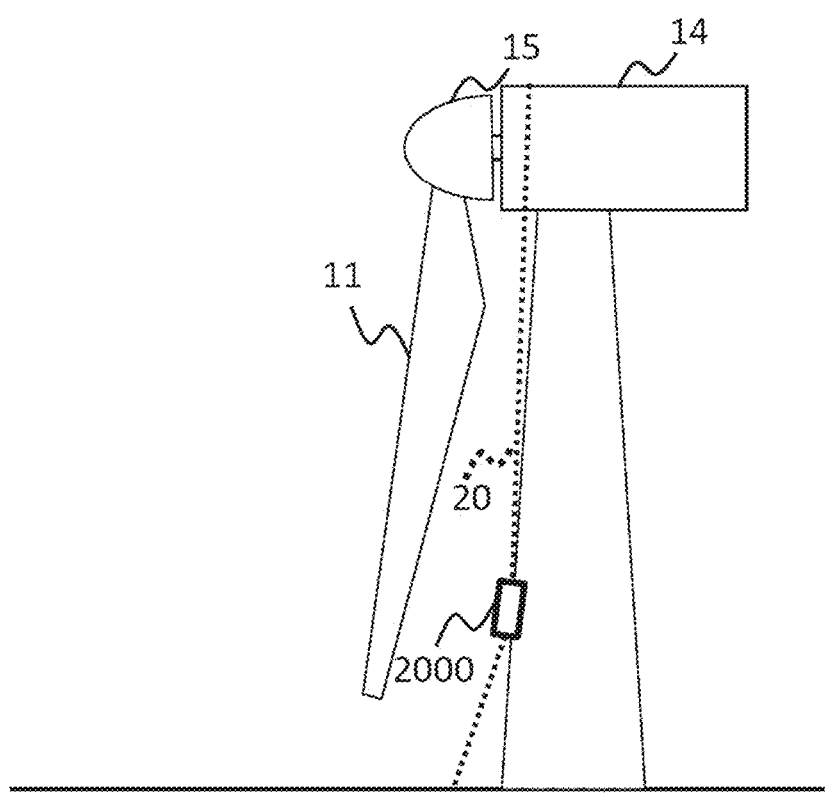
FIG. 15 A figure showing a device 2000 that vertically moves on a tower of a wind turbine.

The device 2000 can comprise a wheel for travelling 125 on the opposite side to an attaching means 130. The wheel for travelling 125 is different from a wheel for travelling on leading edge 122 and a wheel for travelling on leading edge 122 provided in a different position from a wheel for travelling on blade side surface 123, or the wheel for travelling on blade side surface 123. The wheel for travelling 125 is a wheel for travelling in a place other than the blade of the wind turbine. The wheel for travelling 125 is used, for example, to move the device 2000 while inclining it like a carry bag when carrying the device 2000. The wheel for travelling 125 is used, for example, for the device 2000 to travel on the tower of the wind turbine. It may be necessary to image not only the surface on the leading edge side but also the surface on the trailing edge side when performing maintenance on the blade of the wind turbine. In this case, if the trailing edge side is imaged from the ground, the imaging location is so far from the trailing edge that it is difficult to obtain a clear image. As shown in FIG. 15, the device 2000 can image the trailing edge side from a position closer to the trailing edge by vertically moving on the tower of the wind turbine by the wheel for travelling 125 along a rope 20 extending from the nacelle of the wind turbine, and can thereby obtain a clearer image.

Although it was explained that the wheel for travelling 125 is provided on the opposite side to the attaching means 130 in the example shown in FIG. 14, the wheel for travelling 125 can be provided in any position as long as it can travel in contact with the tower of the wind turbine. For example, the wheel for travelling 125 may be provided on the side of the device 2000 (the side with the winch 121 in FIG. 14).

It is preferable that the rope 20 extends from the front side of the nacelle 14 of the wind turbine 10, that is, from near the hub 15, to the ground as in the example shown in FIG. 10 to FIG. 12. That is because, when the rope 20 extends from the rear side of the nacelle 14 to the ground, the rope 20 may hang on the lateral side of the wind turbine 10 and the device 1000 may come into contact with the tower when the device 1000 is moved along the rope 20. For example, when hatches 16 of the nacelle 14 (see FIG. 16) are disposed on the rear side of the nacelle 14, the rope hangs on the lateral side of the wind turbine 10 like the rope 20' in FIG. 16 when the rope is merely fixed to the hatches 16. In this case, a rope position adjusting device 500 shown in FIG. 16 can be utilized so that the rope 20 extends from the front side of the nacelle 14 to the ground.

Figure 16:
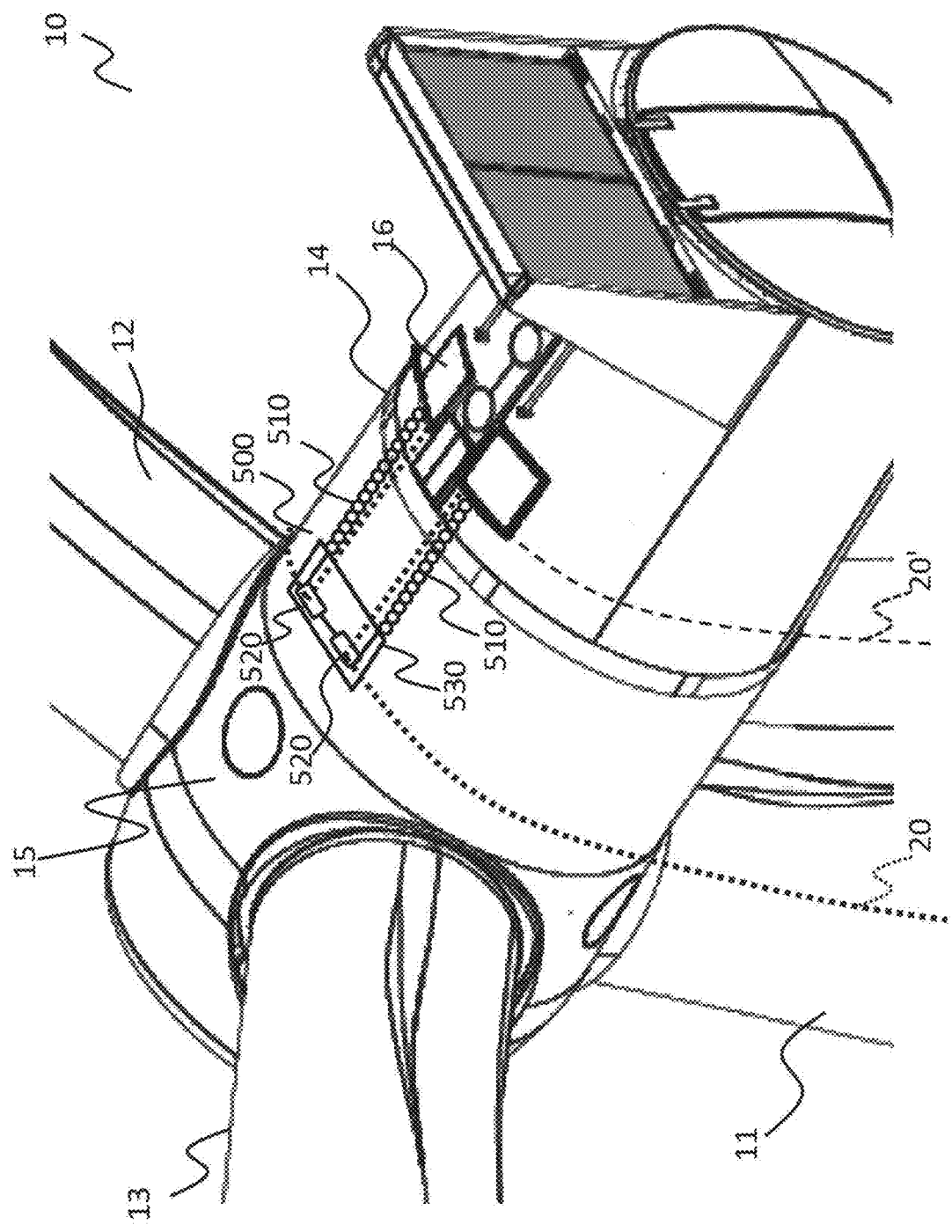
FIG. 16 A perspective view of a nacelle 14 of a wind turbine 10 viewed from behind.

FIG. 16 is a perspective view of a nacelle 14 of a wind turbine 10 viewed from behind. Like reference numerals are given to the same components as those shown in FIG. 1 to FIG. 3 and FIG. 10 to FIG. 12. The explanation of the components is omitted here.

A rope position adjusting device 500 comprises two slings 510, two carabiners 520, and a mat 530. One end of the slings 510 is fixed to hatches 16, and the other end of the slings is connected to the carabiners 520. The two carabiners 520 are connected to each other. This results in that the two slings 510 and the two carabiners 520 form a loop shape on the nacelle 14. The mat 530 is disposed between the carabiners 520 and the slings 510, and the nacelle 14, so as to prevent the nacelle 14 from being damaged by the carabiners 520 and the slings 510. Further, the mat 530 also plays a role as a seat for holding the loop shape formed by the carabiners 520 and the slings 510.

Ropes 20 extending from the hatches 16 extend in the direction in which the slings 510 extend, that is, the forward direction of the nacelle 14, and the ropes are turned by passing through the carabiners 520 to extend in the direction to the ground. The ropes 20 fixed to the hatches 16 can extend from the front side of the nacelle 14 to the ground by the rope position adjusting device 500.

For example, it is possible to adjust the position in which the ropes 20 extend from the nacelle 14 to the ground by configuring the length of the slings 510 adjustable.

Although the two ropes 20 extending from the hatches 16 extend in parallel to the direction in which the slings 510 extend in the example shown in FIG. 16, the present invention is not limited to the above. The two ropes 20 may be crossed. For example, the rope 20 extending from the hatch 16 on the left side of the nacelle may extend to the carabiner 520 disposed on the right side of the nacelle and the rope may be turned by passing through the carabiner 520 to extend in the direction to the ground, whereas the rope 20 extending from the hatch 16 on the right side of the nacelle may extend to the carabiner 520 disposed on the left side of the nacelle and the rope may be turned by passing through the carabiner 520 to extend in the direction to the ground. Crossing the two ropes 20 enables decreasing the distance of the swing of a device 100 even when one of the two ropes 20 breaks during working.

Maintenance on a blade of a wind turbine is performed about once a year at most. Although the present invention can inexpensively provide a device for performing maintenance on an object, it is less cost-effective to purchase a device for performing maintenance for such maintenance performed once a year. In this regard, if an owner of a wind turbine can rent a device 100 for performing maintenance on the wind turbine, the cost can be further reduced and the cost-effectiveness can be improved.

A supplier of the device 100 can do rental business of the device 100 using, for example, the device 100 constructed in a size that can be conveyed by home delivery service (e.g., the full length of 80 cm or less, the weight of 40 kg or less). For example, the size that can be conveyed by home delivery service may be achieved by configuring the device 100 in such a manner that a winch 121 can be separated and separating the winch 121 from the device 100. For example, the size that can be conveyed by home delivery service and/or can be carried may be achieved by configuring the device 100 in such a manner that the device 100 can be separated into four parts and disassembling the device 100 into four parts. Upon doing so, the subsequent assembling work will be easy if, for example, attaching means 130 are configured to be separatable from the device 100 with the attaching means 130 put together.

The owner of the wind turbine can always use the device 100 of the latest model to perform maintenance by renting the device 100. Further, when the supplier of the device 100 exchanges consumables such as a rag 162 for a washing means 160, a sand paper 172 for a polishing means 170, and paint for an applying means 180 and supplies the device 100, the owner of the wind turbine can perform maintenance on the wind turbine without being troubled. When the labor and cost for maintenance on the wind turbine are reduced, the maintenance on the wind turbine can be performed more frequently, which leads to more efficient operation of the wind turbine. One of the factors which enable increasing the frequency of maintenance on the wind turbine is that use of the device 100 of the present invention can eliminate the need for a worker to work at a high place and thereby maintenance can be safely performed.

Although a device and method for performing maintenance on a blade of a wind turbine were explained in the examples explained with reference to FIG. 1 to FIG. 16, the present invention is not limited to the above. The target for which maintenance is performed by the device and method of the present invention can be any object requiring maintenance to which the device 100 can attach. For example, any object may be a wall surface of a building, or may be a main wing of a plane. For example, in the case of a wall surface of a building, it is necessary to wash dirt due to rain. For example, in the case of a main wing of a plane, it is necessary to inspect and wash the wing in order to keep the surface of the wing smooth. The device 100 can attach to the object by an attaching means 130. For example, the device 100 attaches to a wall surface of a building by holding a projected portion of the wall surface of the building with the attaching means 130. For example, the device 100 attaches to a main wing of a plane by holding the main wing of the plane with the attaching means 130.

For example, any object can be a part of any structure. For example, any structure may be a wind turbine. In this case, any object can be a blade of the wind turbine. Any structure may be a building. In this case, any object can be a wall surface of the building. Any structure may be a plane. In this case, any object can be a main wing of the plane. For example, a device 2000 is able to travel on a portion other than a blade of a wind turbine, for example, on a tower, by a wheel for travelling 125. For example, the device 2000 is able to travel on a portion other than a wall surface of a building, for example, on a rooftop by the wheel for travelling 125. For example, the device 2000 is able to travel on a portion other than a main wing of a plane, for example, on a body, by the wheel for travelling 125.

Any object is preferably an object at a high place. A high place herein refers to a place in a height that a worker on the ground cannot reach. A high place may be, for example, a place 3 m or more high from the ground, a place 5 m or more high from the ground, a place 10 m or more high from the ground, or a place 100 m or more high from the ground. A high place may be, for example, a place 3 m to 100 m high from the ground, a place 5 m to 100 m high from the ground, or a place 10 m to 100 m high from the ground. It should be noted that the ground may be an outdoor place, or may be an indoor place.

Any object is preferably an object having a non-uniform cross section. Since it is possible to deal with the change in the shape of an object by deformation of the attaching means 130 of the device 100, the device 100 can maintain the attached state even when the shape of the object changes in association with movement when the device 100 moves on the object having a non-uniform cross section. An object having a non-uniform is preferably a wing body, and is more preferably a blade of a wind turbine.

Further, although the surface on which the device 100 attaches to any object has any angle, it is preferable that the surface on which the device 100 attaches to any object is inclined relative to the vertical direction. That is because, in addition to the holding force by the attaching means 130, the gravity acting on the device 100 acts so as to push the device 100 against the object due to attachment of the device 100 to the inclined surface, and the device 100 is thereby more stable on the object.

Further, although it was explained that the posture of a device 100 is controlled using two ropes 21 connected to the device 100 in the examples explained with reference to FIG. 2A, FIG. 2B, and FIG. 7, the present invention is not limited to the above. Operating the device 100 by at least two ropes remains within the scope of the present invention. For example, an operator can deliver a specific instruction to the device 100 via the tension of the ropes by operating at least two ropes. For example, simultaneously pulling a first rope and a second rope may be an instruction to stop. For example, pulling the second rope once after pulling the first rope twice may be an instruction to advance. Upon doing so, the device 100 may comprise a converter converting the tension applied to the ropes to a predetermined electrical signal to read out an instruction represented by the tension. In this manner, by operating the device 100 using at least two ropes, it is possible to operate the device 100 using tension without depending on electronics such as a controller.

Further, although a device for performing maintenance on an object was explained in the examples explained with reference to FIG. 1 to FIG. 16, the present invention is not limited to the above. The device of the present invention may be a robot having a function to achieve any objective comprising performing maintenance. For example, any objective may be an objective to carry goods to a high place. It is possible to make it easy to carry goods to a high place by attaching a device mounted with goods to an object at a high place (e.g., an outer wall of a balcony of an apartment). For example, any objective may be an objective to decorate an object. It is possible to easily decorate an object at a high place by attaching a device with decoration to the object at a high place.

The present invention is not limited to the above-described embodiments. It is understood that the scope of the present invention should be interpreted only by the Claims. It is understood that those skilled in the art can practice an equivalent scope based on the descriptions in the present invention and common general knowledge from the descriptions of specific and preferable embodiments of the present invention.

INDUSTRIAL APPLICABILITY

The present invention is useful for providing a device, system, and method for inexpensively and safely performing maintenance on an object.

Further, the present invention is also useful for enabling performing maintenance on an object in accordance with the change in the shape of the object.

Furthermore, the present invention is also useful for providing a method for operating a robot located away from an operator by tension.

REFERENCE SIGNS LIST 10 wind turbine
11, 12, 13 blade
14 nacelle
15 hub
20, 21 rope
100 device
110 maintenance means
121 winch
122 wheel for travelling on leading edge
123 wheel for travelling on blade side surface
130 attaching means

The invention claimed is:

1. A method for performing maintenance on a blade of a wind turbine, the wind turbine comprising a tower and multiple blades, the method comprising: positioning one blade of the multiple blades of the wind turbine for maintenance so as to extend the one blade vertically downwards, thereby a leading edge of the one blade is inclined to a vertical direction; stretching at least one rope over the one blade of the wind turbine; attaching a device for performing maintenance onto the leading edge of the one blade of the wind turbine, comprising connecting the at least one rope to the device, fixing at least two ropes different from the at least one rope to the device, and attaching, by at least one frame on each side of the blade, the device onto the leading edge of the one blade, wherein the at least one rope and the at least two ropes assist in stabilizing the posture of the device before the device comes into contact with the one blade, the device not being in contact with the tower; moving the device on the leading edge of the one blade along a direction in which the at least one rope is stretched while the device is pushed against the leading edge of the one blade by gravity acting on the device, the at least two ropes assisting in stabilizing the posture of the device while the device is moving on the leading edge of the one blade along the direction; and performing, by the device, maintenance on the one blade of the wind turbine during movement of the device along the direction in which the at least one rope is stretched; wherein the at least two ropes are used to control an inclination of the device by adjusting at least an angle of the at least two ropes, wherein the at least one frame on a first side of the one blade is biased to press on to the one blade from the first side and the at least one frame on a second side of the one blade is biased to press on to the one blade from the second side, wherein each rope of the at least two ropes comprises a first end and a second end opposite the first end, wherein the first end of each rope of the at least two ropes is connected to the device, and wherein each rope of the at least two ropes extends in a direction from the first end connected to the device toward a worker or a movable robot manipulating the second end of said each rope.

2. The method of claim 1, wherein the moving comprises moving the device along an inclined surface of the one blade of the wind turbine.

3. The method of claim 2, wherein:
at least one rope stretched over the one blade of the wind turbine is two ropes; and
the device comprises two winches which wind the two ropes stretched over the one blade of the wind turbine, on both sides of the device.

4. The method of claim 1, wherein:
the moving comprises moving the device on the leading edge of the one blade in a first direction along the direction in which the at least one rope is stretched, and moving the device, on the leading edge of the one blade in a second direction different from the first direction along the direction in which the at least one rope is stretched; and
the performing the maintenance comprises performing, by the device, a first maintenance during movement of the device in the first direction, and performing, by the device, a second maintenance different from the first maintenance during movement of the device in the second direction.

5. The method of claim 4, wherein:
at least one rope stretched over the one blade of the wind turbine is two ropes; and
the device comprises two winches which wind the two ropes stretched over the one blade of the wind turbine, on both sides of the device.

6. The method of claim 1, wherein using the at least two ropes to control the inclination of the device is performed by the worker.

7. The method of claim 6, wherein:
at least one rope stretched over the one blade of the wind turbine is two ropes; and
the device comprises two winches which wind the two ropes stretched over the one blade of the wind turbine, on both sides of the device.

8. The method of claim 1, wherein:
at least one rope stretched over the one blade of the wind turbine is two ropes; and
the device comprises two winches which wind the two ropes stretched over the one blade of the wind turbine, on both sides of the device.

9. The method of claim 8, wherein:
the two winches have a first mode in which the two winches are independently controlled and a second mode in which the two winches are controlled in synchronization;
connecting the two ropes stretched over the one blade of the wind turbine to the device comprises actuating the two winches in the first mode; and
moving comprises actuating the two winches in the second mode.

10. The method of claim 1, wherein using the at least two ropes to control the inclination of the device is performed by the movable robot.

11. The method of claim 10, wherein:
at least one rope stretched over the one blade of the wind turbine is two ropes; and
the device comprises two winches which wind the two ropes stretched over the one blade of the wind turbine, on both sides of the device.

12. The method of claim 10, wherein using the at least two ropes to control the inclination of the device is performed by the movable robot, which holds the at least two ropes, moving on the ground.

13. The method of claim 12, wherein:
at least one rope stretched over the one blade of the wind turbine is two ropes; and
the device comprises two winches which wind the two ropes stretched over the one blade of the wind turbine, on both sides of the device.

14. A method for operating a robot, wherein at least one first rope is connected to the robot and at least two second ropes different from the at least one first rope are fixed to the robot, the at least two second ropes extending in a different direction from the at least one first rope, the method comprising: positioning one blade of a wind turbine so as to extend vertically downwards, thereby a leading edge of the one blade is inclined to a vertical direction, wherein the wind turbine comprises a tower and multiple blades; using the at least one first rope and the at least two second ropes to assist in stabilizing the posture of the robot before the robot comes into contact with the one blade, the robot not being in contact with the tower, and the at least two second ropes assisting in stabilizing the posture of the robot while the robot is in contact with the one blade, attaching, by at least one frame on each side of the one blade, the robot onto the leading edge of the one blade; moving the robot along a direction in which the at least one first rope extends while the robot is pushed against the leading edge of the one blade by gravity acting on the robot, the at least two second ropes assisting in stabilizing the posture of robot while the robot is moving on the leading edge of the one blade along the direction; wherein the at least two second ropes are used to control an inclination of the robot by adjusting at least an angle of the at least two second ropes; and wherein the at least one frame on a first side of the one blade is biased to press on to the one blade from the first side and the at least one frame on a second side of the one blade is biased to press on to the one blade from the second side, wherein each rope of the at least two second ropes comprises a first end and a second end opposite the first end, wherein the first end of each rope of the at least two second ropes is connected to the robot, and wherein each rope of the at least two second ropes extends in a direction from the first end connected to the robot toward a worker or a movable robot manipulating the second end of said each rope.

15. The method of claim 1, wherein the first end of each rope of the at least two ropes is connected to the device near the center of gravity of the device.

* * * * *